(12) United States Patent
Solomon

(10) Patent No.: US 8,570,381 B2
(45) Date of Patent: *Oct. 29, 2013

(54) MULTI-FUNCTIONAL MODULAR DIGITAL IMAGING SYSTEM

(76) Inventor: Neal Solomon, Oakland, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/932,852

(22) Filed: Mar. 8, 2011

(65) Prior Publication Data

US 2012/0229654 A1   Sep. 13, 2012

(51) Int. Cl.
*H04N 5/225*   (2006.01)
(52) U.S. Cl.
USPC ....................... 348/207.1

(58) Field of Classification Search
USPC .............. 382/163, 232, 172, 255; 348/207.1
See application file for complete search history.

(56) References Cited

U.S. PATENT DOCUMENTS

2008/0174678 A1* 7/2008 Solomon .................. 348/231.99
2009/0263012 A1* 10/2009 Georgis et al. .............. 382/163

* cited by examiner

*Primary Examiner* — Roberto Velez
*Assistant Examiner* — Stephen Coleman

(57) ABSTRACT

A multi-functional digital imaging system is described that disaggregates camera functions into modular camera functionality. Analytical camera functions of image assessment and control are exported to at least one external computer. The system filters image files in an external computer by using an external DSP and imports the corrected file to the camera for storage and display.

3 Claims, 25 Drawing Sheets

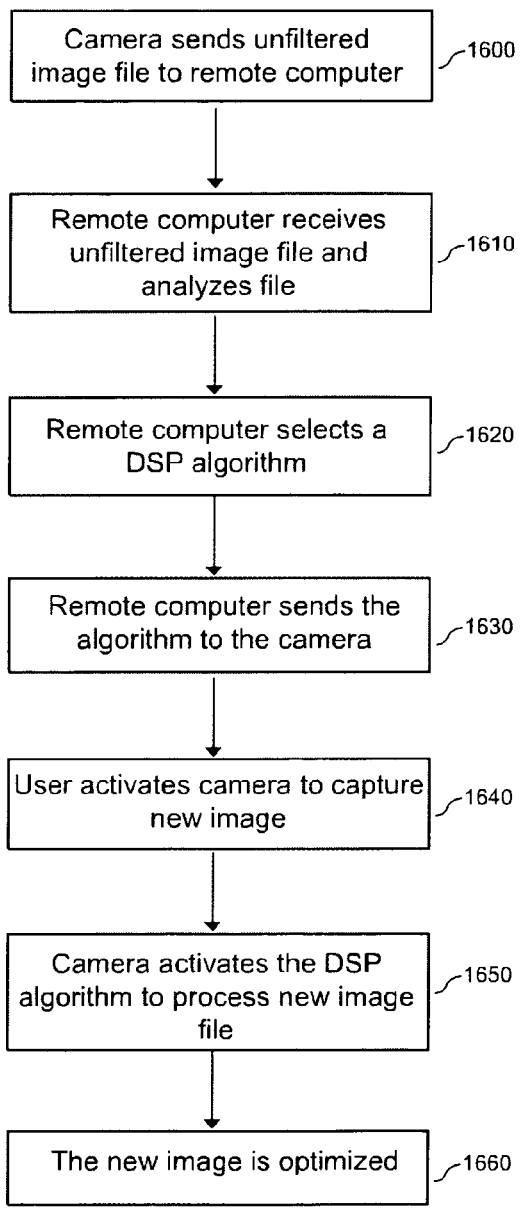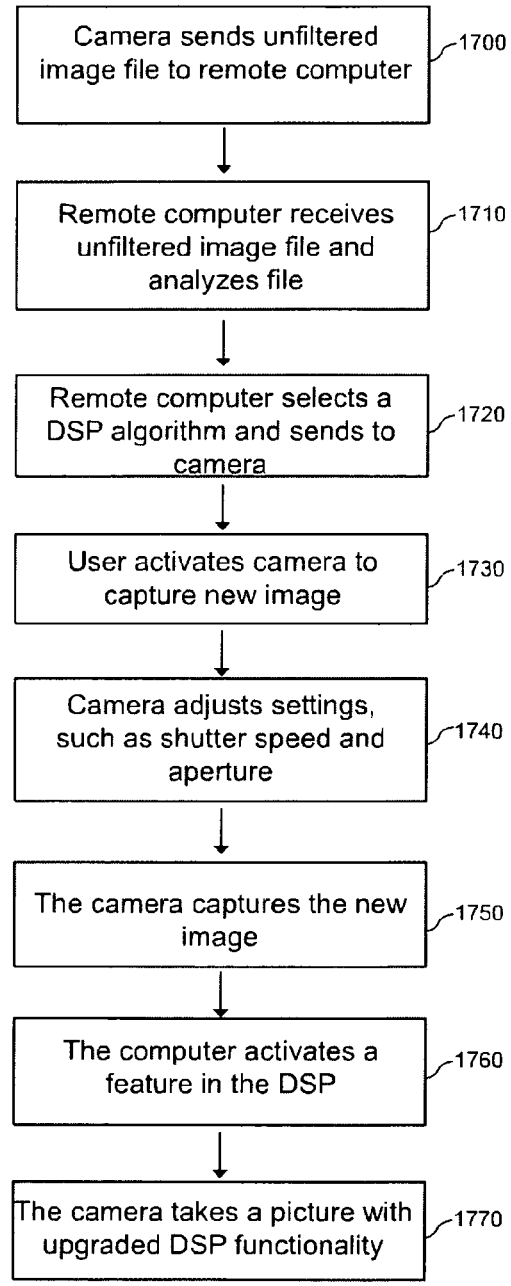

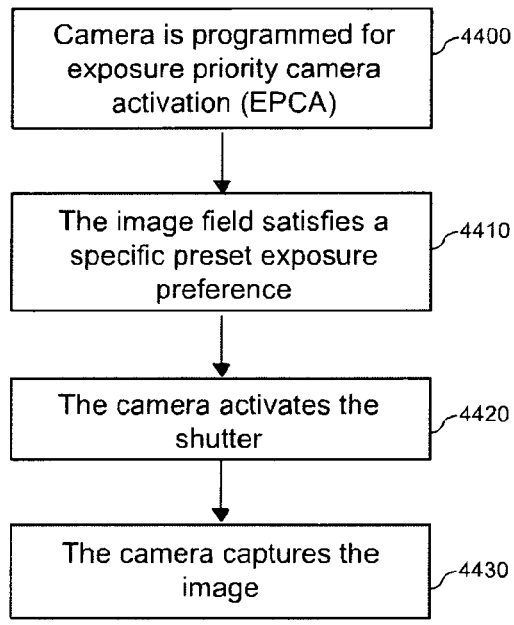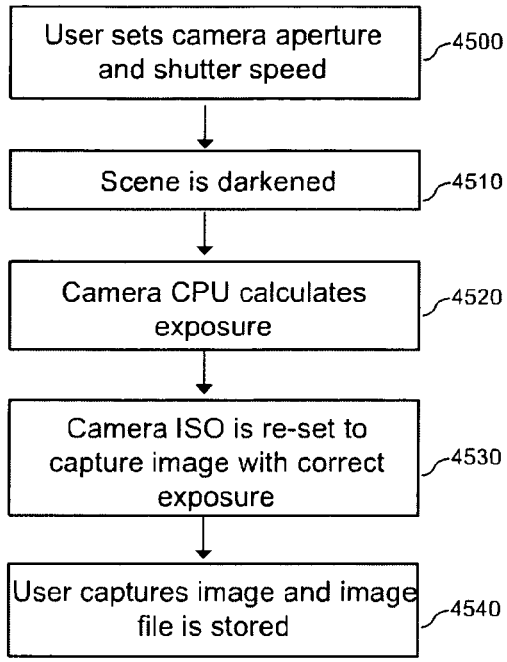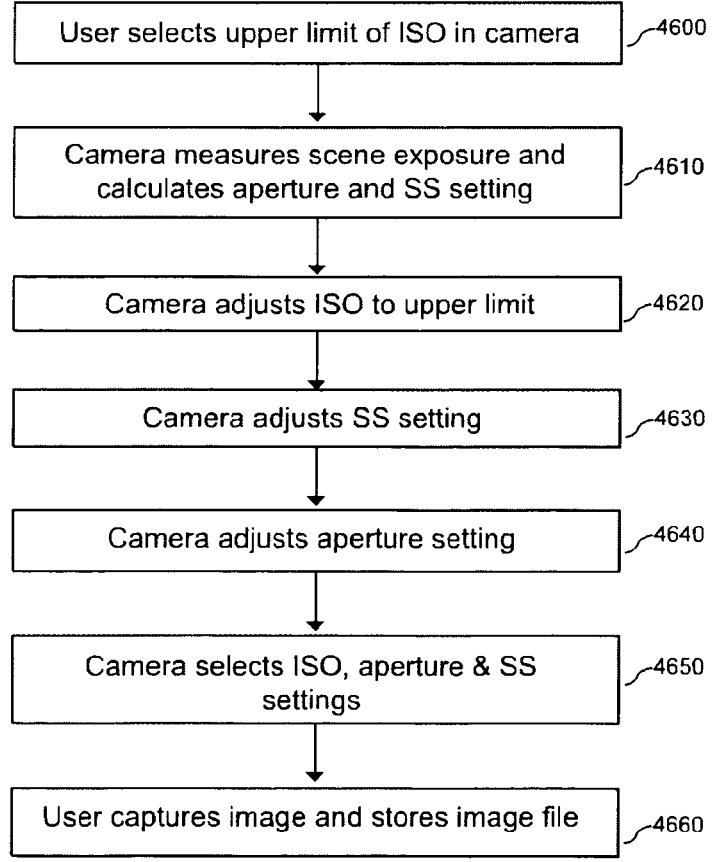

MULTI-FUNCTIONAL MODULAR DIGITAL IMAGING SYSTEM

CROSS-REFERENCES TO RELATED APPLICATIONS

The present application claims the benefit of priority under 35 U.S.C. §119 from U.S. Provisional Patent Application Ser. No. 61/338,771, filed Mar. 9, 2010, the disclosure of which is hereby incorporated by reference in their entirety for all purposes.

FIELD OF THE INVENTION

The invention pertains to optical image capture, digital image sensors, digital image signal processing, digital image filtration, compression, manipulation and camera circuitry, digital video image signal processing, compression, filtration and manipulation, digital image file storage, and digital image and digital video image display circuitry and display management. The invention also involves network computing functions involving digital imaging and digital video files and database management involving digital imaging and digital video files.

BACKGROUND OF THE INVENTION

A digital camera consists of an optical component, a digital sensor component, image processing circuitry, camera system circuitry, and a file storage component. Each of these component types have undergone, and continue to undergo, evolution. A problem that emerges is the issue of obsolescence. As each component in a camera system is updated, the overall system becomes obsolete, much like a computer. This constant updating and obsolescence forces users to upgrade to newer camera technology every few years.

The history of digital imaging is a story of filtration solutions to optical and digital aberrations. To solve these image aberrations, engineers have used integrated circuits and software techniques to address specific problems. For example, aliasing and moire effects have been solved by applying anti-aliasing and low-pass filters that contain complex software algorithms. Further, the problem of optical aberrations, such as vignetting, pin cushioning and chromatic aberrations, are filtered by applying digital solutions. The need to improve these solutions forces the camera circuitry to be upgraded periodically, which creates the problem of obsolescence.

As camera elements have gotten smaller and more efficient, cameras have become ubiquitous. It is common to find camera components embedded in wireless phones and devices (PDAs), tablets and mobile computers. Not only are these optical systems able to process still digital images, but they are also able to capture, process, filter and manage digital video images. The problem remains, however, whether in digital cameras, digital video cameras or wireless devices with camera components, that the quality of the image produced is often poor. The smaller and cheaper the digital camera, digital video camera or digital optical device, the more problematic the image quality becomes.

So far, the idea of the digital camera has been limited to a device which contains integrated optical components, a sensor component, digital image signal processing circuitry, digital image filtration circuitry and digital file storage circuitry. However, each of these integrated components may be improved upon in a modular way and disintegrated in successor upgraded imaging devices.

It is possible to use digital imaging technologies to improve digital image problems such as optical and digital aberrations. Solomon (U.S. Pat. No. 7,612,805) has developed a digital imaging system for filtration to improve optical and digital aberrations created by lens and sensor constraints. Specific digital imaging filtration techniques are available as algorithms applied to specific imaging problems.

In addition to providing filtration, digital imaging provides the opportunity to manipulate the image to user preferences. For example, it is possible to manipulate depth of field in digital images by controlling lens aperture.

The digitalization of images further allows digital files to be transmitted on computer networks for storage. Shutterfly has developed a business model based on the storage and management of digital images on computer network servers and databases for photo sharing.

The dominant model for advanced digital photography is the digital single lens reflex (D-SLR) camera. In the main, most D-SLR cameras are organized to work within one paradigm. Film-based SLR cameras operate by using a lens apparatus connected to a camera body. When a shutter button is depressed, a microprocessor in the camera activates a shutter in the camera and an aperture in the lens to capture light onto a plane of film after a mirror flips up exposing the film. The silver-halide-based film is then chemically developed and images are preserved.

In a D-SLR, when the shutter button is depressed, a microprocessor (or SoC) in the camera activates a shutter in the camera and an aperture in the lens to capture light onto a digital sensor after a mirror flips up exposing the digital sensor. The sensor is typically either a charge coupled device (CCD) or a complementary metal-oxide semiconductor (CMOS) circuit that converts light to electrons. Once the sensor is exposed to light from the lens, camera circuitry moves the data from the sensor to a digital signal processor (DSP). The DSP performs a set of functions that filter the digital image file and transfers the converted data file to camera circuitry that stores and displays the connected image file. A microprocessor (or SoC), which accesses a database in the camera, controls the image exposure settings, the internal camera circuitry and the mechanical operations of the shutter. In some cases, the camera microprocessor circuitry provides feedback to a microprocessor in the lens in order to measure and control the lens aperture and to synchronize exposure information between the lens aperture and the camera shutter. The user is able to manipulate the lens aperture, the camera shutter speed, the camera ISO speed, the data compression rate, and, in some cases, artificial light (such as a flash). The camera circuitry converts an analog image to digital format and converts the digital file to an analog image for presentation.

When any of these digital camera components can be improved, it is unfortunately necessary to upgrade the entire camera system. This process of upgrading a camera is costly and inefficient for the user. What is needed is a modular system that is able to upgrade different camera components independently.

SUMMARY OF THE INVENTION

The present invention views a camera system as an aggregation of components and functions that may be disaggregated. By disaggregating camera functions, such as sensor, camera circuitry, filtration mechanisms and data storage, it is possible to build a modular and improved camera system. Such a camera system is able to be personalized for specific image functions. Viewed in this light, the modular idea of a camera that is a set of disaggregated components sees a camera as an imaging process.

The present modular multi-functional camera system allows the separation of an optical mechanism from the main components of digital imaging circuitry. The digital capture mechanism can essentially be separate from the digital image filtration components. The digital imaging and filtration circuitry may be separated from the digital storage components. The idea of a camera is thus disintegrated into differentiated components that may be in different locations.

In addition to being physically separated, the disaggregated camera may be modular. Each of the camera components is upgradable without affecting the other components. For example, a digital imaging sensor may be periodically upgraded while not affecting other imaging components. Not only does this concept of camera component modularity increase efficiency of processing digital images but it progressively improves image quality as the components are successively upgraded over time.

The present system therefore develops a modular camera system for image capture, filtration, optimization, display and management of digital still or video files. Each of these camera components may be performed on different platforms. For instance, the digital image capture occurs at one location while the digital filtration occurs at a second location, modeling, analysis and optimization of the digital image at a third location, the digital image management occurs at a fourth location and the image is finally displayed at a fifth location. At any stage in the process, the user may maintain control of the imaging process. In fact, since there is more computer processing and data storage capacity in computer networks than in a camera, the image work flow process is accelerated while the image quality improves appreciably.

Development of the present modular multi-functional digital imaging system results from understanding the limits of digital photography. While digital cameras have evolved in the last few years to include intra-camera computer circuitry for digital image processing, there are significant limits to all aspects of the in-camera components. First, the digital sensor has size and precision constraints. Second, the camera (and lens) electronic circuitry (MPs, ASICs, SoCs and DSPs) have processing constraints. Third, as the camera sensor size increases, the digital image file size correspondingly increases, posing substantial storage limits on the internal camera processing and storage components. Because of the increase in data set and file size, the camera circuitry has limits of multi-tasking. With increased file size also comes a limit in in-camera feedback, which slows down the imaging process. While camera manufacturers can invest in faster chips, this increases the cost of the camera, which further exacerbates the obsolescence problem. Though digital photography has a number of advantages over film photography, there are constraints inherent in the evolution of digital imaging technologies.

The challenges presented here, then, include (a) how to disaggregate digital camera functions, (b) how to integrate external computer functions into a digital camera, (c) how to efficiently compress and decompress digital and video images in a lossless and scalable way (d) how to modify DOF by adjusting aperture, shutter, ISO (and flash) using feedback mechanisms of a digital camera, (e) how to evolve and apply algorithms for digital camera applications, (f) how to optimize digital images with remote network computer database management systems, (g) how to optimize digital video imaging with an external network computer system, (h) how to analyze digital images in real-time, (i) how to optimize a digital video image, (j) how to organize an image for different displays, (k) how to organize a DSP in a remote computer(s) or in a display, (l) how to use computer networks for processing, storage and display of digital images (m) how to manage digital image storage and retrieval and (n) how to prevent continued camera obsolescence.

Digital imaging has become ubiquitous in recent years. Consequently, the present invention applies to a range of imaging technologies. The imaging devices and systems to which the present invention applies include all digital cameras and digital video cameras. These camera devices include cell phones, PDAs, telephones, video camcorders, digital video cameras, digital SLRs, laptops, netbooks, tablet computers and video teleconferencing systems. The system also applies to medical diagnostics, sensor networks, satellite imaging systems, printers and copiers.

The present system solves a range of imaging multi-objective optimization problems (MOOPs). For example, the system modulates shutter speed, aperture and ISO (and flash) to optimize DOF. Also, the system modulates exposure, zoom and video. DSPs and image processing circuitry are optimized to solve each type of MOOP.

The present invention provides a set of advances to the field of digital imaging.

NOVELTIES OF THE INVENTION

The present system develops a disaggregated digital imaging system which consists of a set of modular components. Viewed in this light, cameras will consist of less internal image processing components, which will control their costs and persistent obsolescence. Instead, the digital image processing components are external to the camera, downloaded to the camera or contained in external devices such as laptop or network computers. For example, the digital image filtration, analysis, modeling and optimization functions are better performed off-site.

The present invention reconceptualizes DSPs, which are a main processing engine of modern digital cameras. DSPs are able to process multiple pathways, to download customized algorithms and to modulate their resources based on user demands. In effect, the DSP is changed from a fixed camera circuit function to a process used to optimize individual user workflow.

Since the problem of larger, and escalating, image data files is becoming more prominent, the present system solves the problem of in-camera large file processing. This is performed, first, by employing a novel compression algorithm. Furthermore, using external computer network data storage dramatically transforms user work flow.

External computer networks become integrated into the extended modular camera system by utilizing broadband bandwidth. As broadband bandwidth becomes a commodity, access to computer networks becomes a utility. The present invention conceives of digital image processing as a service in which images are analyzed, filtered, optimized and stored in computer networks, but controlled by user customization.

ADVANTAGES OF THE INVENTION

Digital imaging technologies provide opportunities to improve photography over the generation of film imaging technologies. With the present invention, cameras become modular and obsolescence is substantially limited.

The present system allows the camera to be disaggregated into specific upgradable components that allow the management of image work flow in order to optimize image quality for each user. There are layers of features available to users on demand that turns imaging into a process. Image processing speed is improved along with the dramatic increase in the size and quality of image files.

The combination of these elements suggests that each camera is personalized for each user at the most efficient cost. As each photographer uses more features, the camera as service process increases the fees correspondingly. Each user may optimize the digital imaging process by using extensive computer network functionality of image file analysis, modeling, filtration, optimization, storage and display.

Overall, camera prices decline markedly while image quality dramatically increases in the present system. Smaller imaging components in inexpensive devices (PDAs, smart phones, tablets, laptop computers and so on) become feature rich elements that optimize digital imaging and digital video.

LIST OF ABBREVIATIONS

ASTC, application specific integrated circuit
CCD, charge coupled device
CMOS, complementary metal oxide semiconductor
CRT, cathode ray tube
DCT, discrete cosign transform
DOF, depth of field
D-SLR, digital single lens reflex (camera)
DSP, digital signal processor
DVI, digital video imaging
EPCA, exposure priority camera activation
FPGA, field programmable gate array
FFT, fast Fourier transform
LCD, liquid crystal display
LED, light emitting diode
MOOP, multi-objective optimization problem
OLED, organic light emitting diode
OPCA, object priority camera activation
PDA, personal digital assistant
RGB, red green blue
SDI, still digital image
SoC, system on chip

DESCRIPTION OF THE MAIN EMBODIMENTS OF THE INVENTION (I) Modular Camera Functionality A digital camera is comprised of a lens, a digital sensor, integrated circuitry and storage. While the lenses, sensors and storage components are generally commodities, the filtration, optimization and management of digital image files are performed by camera circuitry that consists of ASICs, DSP(s), microprocessors and SoC. The present invention advances the view that minimal circuitry in the camera device is an advantage so as to keep the camera device efficient and inexpensive. On the other hand, massive computing power is available remotely to process aspects of the digital image so as to efficiently add value to the photographer.

(1) Modular Camera Components

Digital cameras become obsolete every two to three years, in a similar way to computer component developments. While the lenses do generally not become obsolete as quickly, the camera digital sensor and processing circuitry often quickly become obsolete.

In the present invention, the sensor and chipset of a digital camera are upgradable. A sensor is built into a package or cage that is removable. When a sensor is upgraded, the modular package is removed from the camera and replaced with another modular package with an upgraded digital sensor.

The digital circuitry is also upgradable. The DSP is contained in a module that is removed from the camera and replaced with an upgraded DSP. The new DSP plugs into the compartment that housed the original DSP.

The camera SoC circuitry is also upgradable. The SoC module is removable and replaceable.

The advantage of this model is that after a user buys a digital camera body, the user then will pay a nominal fee for a part upgrade (either a sensor or a DSP or both) rather than a whole new camera.

So far, cameras do not allow chip upgrades in a modular way.

The modular camera is a more efficient upgrade path since it is relatively inexpensive for manufacturers to make supplementary chip components than to design and manufacture wholly assembled devices. The present invention promotes an evolutionary view of the camera that resists, or even transcends, obsolescence.

(2) Method for Activation and Deactivation of Camera Components

Cameras are generally sold with a set of active components. The electronic circuitry is tailored to the sensor and the DSP is programmed to perform a set of functions that describe the total list of functions of the particular camera model.

The present invention over-determines the camera components by constraining some functions. The digital sensor, the DSP and the camera circuitry are initially sold with limited specific functions. In order to obtain the total utility of the sensor, DSP and circuitry, the user must pay an additional fee to unlock the additional function.

For example, in order to obtain a filtration algorithm in-camera, the user must pay a fee for software to activate the DSP algorithm.

This model allows the user to customize the camera for their needs.

By allowing an over-determined camera to be sold for a significantly lower cost, the electronics components are activated by a supplemental fee-for-use.

The analogy of this model is for a deactivated math co-processor or GPU on a computer motherboard or chipset.

While the initial camera function set is minimal, the total available functionality may be substantial. In one implementation, the camera contains a system on chip (SoC) that includes a DSP, a microprocessor and ASICs. Specific SoC circuitry is disabled in different models of the camera. This approach allows the production of a single chip in a range of camera models, which increases manufacturing efficiency.

This temporary deactivation of potential camera features in a modular camera disaggregates the features and allows the manufacturer to sell features as a supplement to the initial price of the camera. Each digital function is decomposed in a dynamic and integrated unit.

(3) Multi-Functional DSP

Digital signal processors (DSPs) are integrated circuits that process specific functions to transform a digital signal from the digital sensor into an optimized digital image file. The DSP is generally an ASTC, though it may be a microprocessor, an SoC or an FPGA. Since DSPs are pre-programmed to perform specific digital signal functions to mate with a specific digital sensor, they are generally ASICs. The DSPs use complex computational algorithms to perform filtration tasks on the digital sensor file.

The present invention conceives of a DSP as an upgradable multi-functional circuit. Though the DSP is pre-programmed to perform numerous specific predetermined operations, software is periodically downloaded to the DSP to update its functionality to perform optical and digital functions.

The present invention allows users to reprogram the DSP by providing customized software. Even though the DSP is an ASIC, the DSP may be reprogrammed on demand.

The invention draws from the FPGA logic of DSP transformation from one ASIC position to another ASIC position to perform different functions with varied circuitry configuration. The ability of an ASIC DSP to be reprogrammed with periodically updated software is a major advance because it allows the DSP to become dynamic rather than deterministic.

The upgradability of the DSP software allows the personalization and optimization of the DSP and, by extension, the camera.

Since the sensor may be upgraded in the present invention, the DSP software will require periodic updating in order to filter new sensor data files.

In one embodiment of the present invention, the system uses a multi-core DSP to perform multiple simultaneous functions. When the camera is upgraded from a single-core DSP to a multi-core DSP, the software is upgraded to process signals from the digital sensor. A multi-core DSP is able to break down each function for rapid simultaneous (i.e., parallel) or sequential operation. One advantage of the multi-core DSP model is the acceleration of processing time relative to single-core DSPs. In one implementation, the multi-core DSP is a multi-layer device in a 3D chip. In another implementation, the DSP circuitry is contained within a more substantial system on chip (SoC) circuitry in the camera device.

In an embodiment of the invention, two DSPs are used. In this configuration, a controller regulates the toggling of image file processing between the DSPs. This approach accelerates the processing of data files from the sensor to storage.

In another embodiment, the DSP is programmable. The DSP is a programmable ASIC or a complex programmable logic device (CPLD) or hybrid circuit. The programming may be upgraded at any time so as to activate specific functionality that modifies the original program. For example, the filtration and compression algorithms of the DSP may be modified as enhancements are available. The programmability of the DSP increases the in-camera filtration functionality and flexibility, and further resists obsolescence.

In the programmable mode, each algorithm used by the DSP to perform a specific function is specified. In some cases, a camera microprocessor identifies a filtration problem and designs a custom algorithm that is forwarded to the programmable DSP. There are instances in which a custom algorithm is activated in a DSP only when a specific threshold is satisfied. In other cases, a custom DSP program is downloaded from a network computer. DSP programs are tracked in the DSP program index.

In another embodiment, multiple DSPs are employed to simultaneously process digital signals from the sensor. The DSP network allows simpler ASIC DSPs to break down the filtration functions using efficient algorithms.

Once the programmability of the DSP is limited by increasingly advanced software programs or algorithms, the DSP may be replaced by inserting an upgraded model into the camera.

(4) Method for Remote Activation and Control of DSP

In some cases the DSP is controlled by a remote computer. The present invention allows the activation of the camera DSP by a remote computer network. For example, a specific type of image is modified with functions that are remotely identified in a computer network or database and relayed to the camera.

In a work flow process context, the remote computer uses massive computational analysis to assess a sample image from the camera. After evaluation of the image, the remote computer selects a DSP algorithm. The remote computer sends the algorithm to the camera and the camera takes pictures of the image type. The resulting image is optimized relative to the original image.

In another implementation of the remote activation process, the camera takes an image with the camera sensor after a remote computer analysis and subsequent adjustment of camera settings. Specifically, the camera sends an image file to a remote computer based on limited internal DSP camera analysis. Once the remote computer performs an analysis, the computer activates a feature in the DSP. The camera then takes a picture with upgraded DSP functionality.

(5) Method for DSP Algorithm Remote Revision

The present invention provides a method for the latest revised algorithms to update the camera DSP. The camera requests the latest algorithms from a computer network library in real time. The computer network fulfills the user request and the DSP is updated with a specific algorithm, such as a hybrid FFT, and the camera implements the new algorithm to filter the digital image files.

This process occurs in one of three ways. First, the active algorithm is requested to install in the device to apply to the image capture in real time. The latest updated algorithm is applied to the camera DSP. When the image is captured, the latest algorithm is automatically applied in the DSP.

Second, the user requests a custom algorithm to solve a new image processing or filtration problem. The remote computer solves the new problem and develops a novel or hybrid algorithm as a result of the analysis. The novel algorithm is implemented in the DSP and the camera solves the problem.

Third, the network computer develops a dynamic algorithm to modify the camera settings. In this implementation, the camera settings (such as aperture, shutter and ISO) are actively modified in order to modify an image. The image parameters are adjusted by the user as the image is captured before the DSP is activated. The DSP then processes the modified image file normally.

(6) System for Multi-Tasking Camera Functions

One of the constraints of digital cameras is the limits of multi-tasking. The internal integrated circuitry is generally limited to ASICs, including the DSP, that sequentially process image files, and a main microprocessor or SoC that controls the overall device. The sequential processing of image files is a fundamental constraint because this causes time delays from shutter depression to file storage. What is needed is a multi-tasking camera. Multi-tasking, however, requires supplemental circuitry.

The present invention upgrades the integrated circuitry of the camera with multi-circuit network ASIC pathways. One pathway is used to move data from one image capture from the digital sensor to one DSP and another pathway is used to move data from the next image capture from the sensor in the sequence to another DSP. Each DSP then processes the image files normally and forwards the files to storage.

The multi-pathway camera circuitry model allows an image to be captured while another image is filtered. Before the first pathway completes the process for its digital file, the second pathway begins its processing functions. When the first pathway completes its processing, it accepts a new image file for processing and so on. Parallel paths accelerate the image capture and processing functions.

In another implementation of the multi-pathway camera circuitry model, a single multi-functional DSP is used. In this case, the DSP may be multi-core or multi-layer. In either event, the DSP has two or more pathways for entrance and exit. In effect, the DSP operates as a multi pathway network component.

One advantage of this model is that it limits time lag between internal camera processing functions. With this approach, the camera is able to (a) perform complex filtering operations that would otherwise delay further processing, (b) take several images in a faster sequence with minimal latency and (c) perform multiple operations simultaneously such as forwarding an image to storage while also analyzing another image. The camera is able to perform complex functions that would otherwise be time consuming, such as stitching two or more images with different exposures into one optimized image or stitching multiple images into a panorama aspect ratio.

In a further implementation of the multi-tasking model, the camera contains a second DSP in the display circuitry. In this approach, after image capture and storage, the camera is able to process filtration of the unrefined image file directly from storage. In this approach, the camera may be functional in continuing to capture images in the traditional capture-filter-store sequence while simultaneously refining the filtration. This multi-tasking approach has numerous advantages because it allows simultaneous analysis and filtration of images both during and after capture, which minimizes downtime and optimizes the camera functionality.

(7) Method for Image Analysis and Optimization Recommendations

The present invention uses a method for camera analysis of images. After analysis, the camera then provides recommendations to the user to optimize a specific scene that is being captured.

An example of the recommendation approach is the application of optimal framing of a scene. Once the image is analyzed by the camera, arrows in the viewfinder suggest to the user to move the camera to one side or another as well as up or down, in order achieve a balanced image. Application of this method solves the framing problem.

In another example, the camera analyzes a scene's lighting and automatically makes exposure data adjustments. However, the camera will also make recommendations to the user to modify the camera settings manually.

In both cases, the camera CPU is activated to compare images in a database to a present scene. The camera then activates a set of responses in the viewfinder to communicate the recommendations to the user in real time.

(8) Image File Evolution Process

The modular camera concept is also applied to the image file itself. In the present invention, the image file evolves in phases. Each phase of image file evolution, that is, from the digital sensor to the ASICs circuitry to the DSP(s) circuitry to storage and display circuitry, involves a modification to the image file much like a factory assembly line. At each phase of the circuitry process, the image file transforms into a filtered and optimized file with several distinct versions based on the action taken to the file by each specific circuit action. The image evolution across the multiple image file versions are tracked by the present system. Each version is tracked by the microprocessor (CPU or SoC) and maintained in storage.

There are advantages of segregating each version of the image file. First, it is possible to undo a specific layer of action at any time. Second, it is possible to return to an original version of the file and perform enhanced filtration that is far superior to the internal camera circuitry.

Each image file version is tagged and stored in a database. Each version is organized, managed, searched and recalled based on the tagged feature set.

Viewed in this way, each image file is an object that evolves.

The original file from the sensor is stored as well as the filtration steps along the way to storage.

In one embodiment of the invention, the image file versions are compressed with lossless compression technology to preserve the original digital bits.

(9) Camera as Remote Wireless Capture Device

The present invention describes a modular disaggregated camera. In this model, the camera integrated circuitry and storage capabilities are integrated with external computer networks. In the main, the invention views the camera as an optical and sensor device with multiple image filtration, storage and display options.

The camera captures a picture, using its lens options, on its sensor and stores the image file. The camera then forwards the image file to an external computer network with broadband wireless technology. The computer network then stores the image files. The image files are then filtered by a remote computer with DSPs and ASICs (or SoCs) in real time. The filtered and optimized image file versions are then accessible to the original camera device for storage of updated files.

This process of using external computers for image optimization is efficient because it maintains limited use of the in-camera filtration and storage capabilities. Since the remote computer network has vast storage, software and hardware functionality, it is useful to "export" the filtration and storage functions from the camera.

With this method, image capture decomposition and manipulation occurs in two or more locations.

In one implementation of the invention, the network computer and two-way broadband access allow performance of filtration functions in real-time. In other words, the camera is used to capture images, the remote computer system to filter the images, and the images are available in the camera nearly instantaneously.

One advantage of this invention is that it allows a stripped down and inexpensive camera to obtain very high quality image results.

This process allows the user to use the computer network as a utility. This network computing as a service has numerous benefits to photographic workflow.

(II) Camera Analytical Algorithms

Increasingly, digital cameras have advanced image processing features built into the internal camera chip set. Functionality and processing of image filtration, editing and management features allows improvement of photographic images. While hardware, such as microprocessor, SoC, DSP and ASICs are used to perform advanced circuit functions, it is the software that solves complex image problems. Specific algorithms are used to program the camera's digital circuitry in order to improve image files.

The present system develops a set of improved algorithms for use in digital imaging. The invention describes image analysis methods, an anticipation process, an image algorithm library organization process, image algorithm evolution, digital image queuing algorithm and a camera activation algorithm.

(1) In-Camera Digital Image Analysis Method

The present invention provides an in-camera image analysis method. A microprocessor in the camera compares the visible scene in the viewfinder (or screen) to similar images in a database. The microprocessor evaluates image categories of exposure, DOF and color and provides recommendations to the user. The recommendations take the form of suggestions to change device settings.

Each user will select specific "styles" or preferences of images. The camera microprocessor then identifies exposure data options and recommends exposure settings of aperture, shutter speed and ISO that allow the user to achieve a style for a particular scene. Once the user selects a particular setting combination option, the camera microprocessor sends a signal to the lens microprocessor to change the aperture setting to correspond to the selected exposure settings. The camera takes the picture and processes the image.

The goal of the in-camera image analysis method is to optimize the image. Image optimization involves balancing a set of factors. In the case of image exposure, particularly for center-weighted exposure metering, the camera light meter specifies a set of readings based on selection of incident light reaching multiple points in the scene. The camera selects aperture and shutter speed options based on the trade-offs in the optimization of the exposure. In the case of aperture, the camera sets a lower limit and an upper limit of aperture setting based on the scene and lens type. In the case of aperture, for example, the camera will not set the aperture too high that the lens shutter speed is too slow. In the case of shutter speed, the camera sets a lower limit and an upper limit of shutter speed setting based on the scene and lens type. In the case of shutter speed, for example, the camera will not set a shutter speed too slow when the lens is a telephoto that is hand-held so as to prevent image blur. The two factors are balanced in the optimization of the exposure for each image type. Optimizing the additional factor of DOF yields a more complex analysis to balance aperture and shutter speed in cases when the image is an object that requires optimal DOF. In this case, the camera analysis is multi-factorial.

The in-camera analysis method is used to provide information to the user—to allow for interaction and feedback between the user and the camera components that yield more user control—and to camera software, so as to prepare the camera for a specific type of image.

(2) Group Digital Image Analysis Method

When similar user images in camera storage are analyzed, they reveal common shared elements. In the present invention, the camera analyzes these images by using the camera SoC to compare them to a database of image types. After the comparison of the images in storage and in the camera database, the camera provides a "filtering" method of recommending specific image settings for similar scenes. When the photographer encounters a scene similar to those that they have previously recorded, as evidenced by the stored image type, the camera uses this information to analyze the present scene. The camera then provides exposure and DOF recommendations to the user based on the group image analysis.

In another embodiment of the group digital image analysis approach, when groups of digital images are processed by the user in a camera, the batch of images is analyzed. Specific aspects of the group of images are evaluated by comparing the images to each other and to a database of similar images. The camera microprocessor (or SoC) is able, for example, to compare the aperture and shutter speed data between images of a specific type. When landscape images are compared, the degree of sky and the exposure of the foreground are recorded. When the photographer encounters a similar landscape scene, the camera adjusts the settings to correspond to the user's preferences.

(3) Method for Anticipation of In-Camera Image Correction Process

Many camera operations are automated. Whether involving image exposure, focus or filtration, modern camera functions have become electronically and mechanically integrated with the press of a button. However, as the camera becomes more automated, there is reduced user control. In order to achieve greater image optimization and creative control, the user needs to have a role in programming the technology that produces the image.

The present invention uses camera analyses of user preferences to allow the camera microprocessor to anticipate common user corrections. The active recommendation approach is based on analyses of images and user preference settings. The camera asks, "Would you like to do X to perform Y function?" When the user responds to a set of options, the camera updates the settings and performs the function in a specific way. In effect, the camera makes recommendations such as, "The camera suggests that you do Z to get a better image" where Z is a change of an exposure setting.

The camera uses machine learning techniques, including genetic algorithms, to analyze user patterns of exposure and scene types to optimize subsequent images. The camera then teaches the user to improve the images by making recommendations along the way of the photographic experience.

This camera analysis of user patterns and preferences has the effect of accelerating the automated camera process of optimizing images for each user.

(4) System for Organization of Digital Image Algorithm Library in Computer System While each digital camera has specific hardware components for image processing, such as ASICs, DSPs, SoCs and microprocessors, that use software programs, the software and firmware are upgradable. The camera hardware components are therefore programmable with software modifications.

In the present system, the camera selects the best algorithm for a task. Specific algorithms are accessed by the camera components to process specific functions. For example, the microprocessor (SoC or CPU) will access a set of algorithms to perform exposure setting optimization; from time-to-time, new exposure setting solutions are developed to improve image results.

In addition to periodic downloads of upgraded camera image processing algorithms, the present invention involves the opportunity for a user to access algorithms on-demand to solve specific image optimization problems. In some cases, only a small adjustment is required, so the user updates an algorithm with a small sequence of program code. These micro-apps are constantly requested and accessed by the user when needed to refine the nuances of in-camera image analysis and optimization.

The present system accesses a library of camera firmware, software, algorithms and applications. The library of software and algorithms is maintained in a network computer for immediate download of the applications. The software and algorithm library is organized into categories according to device type and application function.

One advantage of the software and algorithm library model is that software applications are constantly upgraded and uploaded to the library. As users seek the latest solutions to complex image optimization problems, they access the library database for downloads of the latest solutions.

In one embodiment of the present invention, the software and algorithm library is used on a subscription or fee-use basis. When only a single application is requested, it may be downloaded on demand. However, in one mode, the application may be only used once and then will self-destruct until another fee is paid. This pay per use model is useful to solve a problem only once.

(5) Method for Digital Image Algorithm Evolution

Digital image algorithms are program code that solves specific functional imaging problems in a camera. When the camera hardware is fixed, the software components and algorithms are upgradable. The algorithms are constantly updated to improve solutions to complex image optimization problems. The upgradability of the algorithms allows the algorithms to evolve from version to version. The latest version of an algorithm is typically forwarded to the camera hardware for implementation. Algorithm upgradability and evolution resists obsolescence.

There are two main ways for the present system to upgrade software. First, updated algorithms are automatically forwarded to a camera. This may be free or fee-based. If a user has a software and algorithm subscription, then the program code is automatically sent to the user's camera device(s).

Second, the software and algorithms are available on the Web. The user accesses a remote computer software library on the Web and manually downloads the software or algorithms directly to the camera device(s). One advantage of this approach is that, in addition to camera manufacturers, third-party vendors are able to develop software and algorithm techniques that solve camera problems and usefully update the camera functions.

(6) Method for Pre-Set Threshold Camera Activation

The present invention organizes a camera to activate when a specific preset threshold is achieved. In one case, the camera will take an image only when the exposure criteria are satisfied. In another case, only when a specific object is present, such as in an action scene with a focus match on a moving object, the camera is programmed to take a photograph.

Exposure priority camera activation (EPCA) is achieved after the camera exposure is adjusted to a specific preference. When the image field satisfies a specific preset exposure preference, the camera software activates the shutter and the image is taken. This function is performed by programming the camera microprocessor or SoC to interact with the lens microprocessor.

Object priority camera activation (OPCA) is achieved when the camera auto focus is engaged to track a specific moving object. When the moving object is present, the camera focuses on the object and the camera activates the shutter to take the picture. This process is repeated under specific programmed conditions.

(7) Methods to Modulate ISO to Automate in-Camera Image Exposure

In the present invention, the camera automatically modulates the ISO to correct image exposure. In one mode, the user sets the aperture and the shutter speed; when the image lighting changes, the camera ISO increases or decreases to balance exposure. In another mode, the user sets an upper or lower limit on the ISO. In this case, the camera changes the aperture and/or shutter speed to balance the exposure. Exposure metering data includes ISO as well as aperture and shutter speed factors.

The camera CPU accesses a database with maps of aperture, shutter speed and ISO ranges. These three main factures are analyzed as variables in an optimization problem. The camera meter sues the three main factors to establish image exposure.

In one embodiment, the user sets the limits of the aperture, shutter speed and ISO factors and the camera CPU accesses an algorithm to balance the image exposure. The camera CPU accesses a database of image exposure options to balance exposure based on the user pre-set preferences.

(III) Image Display Management Methods

Image display technology has advanced in recent years to integrate with a range of camera and computer devices. Image displays have become ubiquitous in modern life. Displays are constructed of CRTs, LCDs, TFTs, LEDs, OLEDs and Plasma technologies. Displays are integrated into cameras, computers, PDAs, wireless devices, tablet computers, copiers and printers. Projection technology, including holographics, is also considered a form of display.

In the present invention, image display technology is enhanced to include DSP functionality, coordination of external displays with cameras and automatic display adjustment to accommodate individual eyesight variations.

(1) External Image Display Apparatus with Camera Link

One of the disadvantages of in-camera display technology is the small size. Even for photographers with excellent eye sight, the small displays are not useful for anything but the most essential viewing functions. For this reason, the present invention provides a network link from the camera to a larger display. Digital images from the camera are transmitted to a tablet computer or laptop computer display for review, analysis, filtration and exhibition. This is done with a Wi-Fi or Bluetooth connection between the camera and the external display. The opportunity to display image files stored in camera on one or more external displays opens panoramas of creative opportunities.

(2) Method for Adjusting Image Display for Individual Eyesight Variations

The only way for individuals with imperfect eyesight to see an image clearly on a display is with glasses or contact lenses attached to the user's eyes to correct their vision astigmatism. While this is cumbersome and expensive, it is also unnecessary.

The present invention provides for the adjustment of the filtration of image displays—whether camera or computer displays—by changing the vision correction setting on the displays. The first step is to identify the individual's precise ocular imperfection. This is recorded as a combination of imperfections for both eyes. The imperfection is then compared to a database accessed by the device microprocessor or SoC. The device microprocessor or SoC then selects the vision correction for the display. The microprocessor or SoC sends a signal to the display DSP to filter the display to correspond with the corrective vision solution. The display then adjusts the output image to allow the user to see the image clearly. In effect, the display reverse engineers the image aberration to correct for an ocular aberration in the perceiver rather than in the image file itself. The user then adjusts the display to suit them.

When a different individual uses the display, the display computer is reset for the new user and the original settings for earlier users are stored.

In one embodiment of the invention, a thin film over the top layer of the display is used to adjust the display to accommodate image aberrations.

In another embodiment, the display adjustment process is applied to the viewfinder of the camera. A digital filter is used to adjust the viewfinder appearance by using an ocular modulation algorithm. In effect, the camera viewfinder adjustment is similar to the camera wearing glasses.

(3) Remote Computer Digital Image Management Method and Image Ranking Process

When digital images are taken using a digital camera, the image files are numbered sequentially according to temporal priority. This is a great way to sort images, however, only if the user has a photographic memory.

The present invention allows image files in the camera to be sorted and resorted. After reviewing the image files, the photographer renumbers the image files to sort them according to their preference. This sorting and resorting process continues until the user has identified a set of best images. In effect, with this sorting and management tool, the camera becomes a photo album.

In an embodiment of the invention, the image files are transferred to a computer network for storage. The user accesses the image files remotely in order to sort and resort the image file priorities in a photo album. The images are filtered, backed-up, stored and shared with other computer displays on demand. In essence, the remote computer management system allows the construction of an original slide show in a specific user-organized image order. As new images are stored, they are integrated into the storage system and the image order is continually reprioritized and reorganized. Image ranking of individual images allows individuals to establish multiple portfolios of images.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

DESCRIPTION OF THE DRAWINGS

FIG. 16 is a flow chart showing the process of using a remote computer to send an algorithm to a camera DSP to perform a function.

FIG. 17 is a flow chart showing the process of using a remote computer to filter a digital image file from a camera and upgrading the camera DSP to optimize work flow.

FIG. 44 is a flow chart showing the process of using a camera to capture an image after an exposure preference is satisfied.

FIG. 45 is a flow chart showing the process of modifying a camera ISO to capture an image.

FIG. 46 is a flow chart showing the process of modifying a camera ISO, aperture and shutter speed to capture an image.

DETAILED DESCRIPTION OF THE DRAWINGS

A digital camera consists of an optical component (such as a lens), a digital sensor to convert light from the optical component, and electronic circuitry to process and store the image file. A digital camera may include a mirror mechanism (D-SLR) to enable the user to view the image through the lens as well as integrated exposure metering. A digital camera may include electronic circuitry to enable the camera to process multiple image frames in a second to allow capture of video images. A digital camera may also include enclosed illumination.

Figure 1:
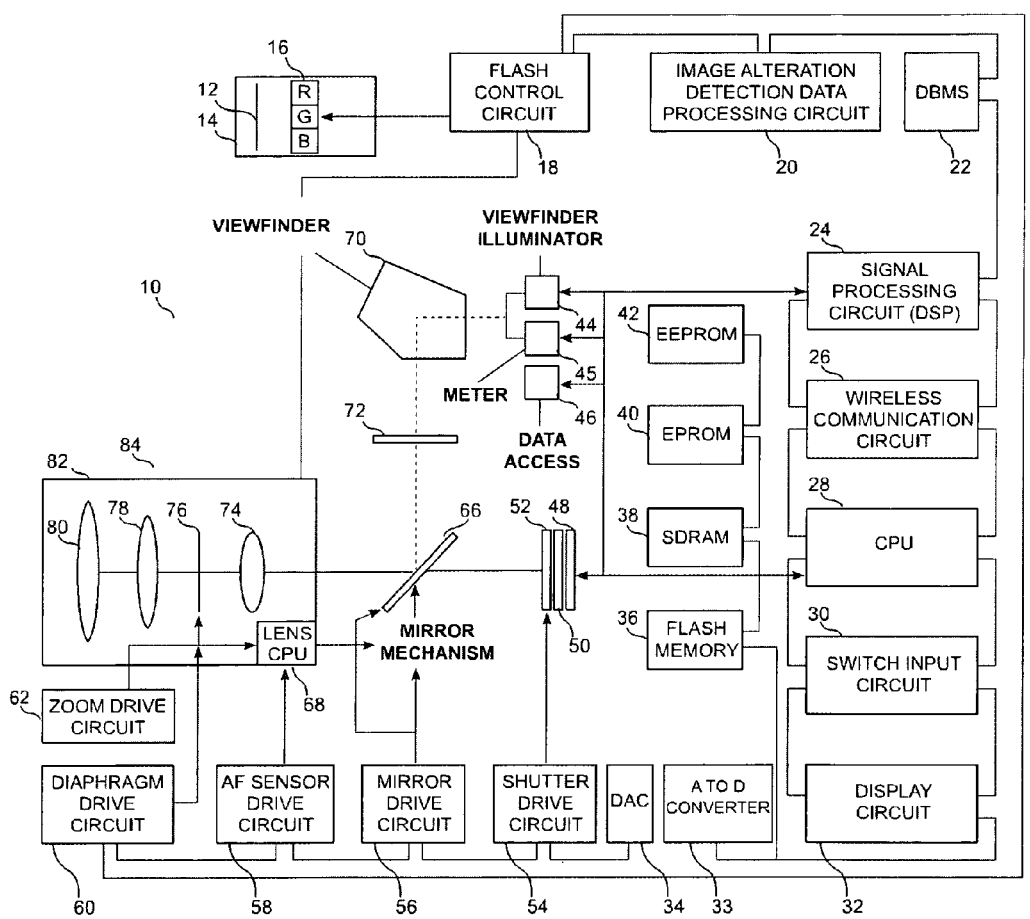
FIG. 1 is a schematic drawing of digital camera circuitry.

FIG. 1 shows a digital camera circuitry. The camera (10) consists of a housing with electronic circuitry to capture, process and store digital image files and a lens (84). The lens consists of a lens barrel (82), a set of lens groupings, including a front lens element (80), a middle lens element (78) and a rear lens element (74). The lens also includes a aperture diaphragm (76) and a lens CPU (68). In some cases, the lens includes at least one motor for autofocus. The lens may be a zoom lens or a fixed focal length lens. If the lens is a zoom lens, which provides a range of optical focal lengths, the lens includes a zoom drive circuit (62). The lens circuitry works in conjunction with the camera circuitry to maintain the aperture with a diaphragm drive circuit (60) and an autofocus sensor drive circuit (58).

In some, but not all cases, the camera contains a flash mechanism to provide artificial illumination. In FIG. 1, the flash mechanism is shown (14) with an illuminator (12) and a light apparatus (16) consisting of red, green and blue light functions. The flash mechanism is connected to a flash control circuit (18). In some cases, the flash mechanism is a separate apparatus that is attached to the camera device and is not internal to the camera.

The camera maintains a mirror in its single lens reflex (SLR) mode. In this case, the mirror mechanism (66) is operated by the mirror drive circuit (56). The mirror is in the down position in order to reflect light to a viewfinder (70) through a diaphragm (72) to allow the image from the lens to be viewed in the viewfinder. Not all embodiments of the invention, however, require a mirror mechanism. The viewfinder is illuminated (44) by a light in order to read information. Electronic data (46) is supplied to the user in the viewfinder, including the metering information provided by the camera metering system (45). The lens has a CPU (68) which may be a microprocessor or an SoC.

The camera uses a shutter apparatus (52), which is driven by a shutter drive circuit (54). When the mirror and the shutter are activated, light passes from the lens to the Bayer filter or anti-aliasing filter (50) and to the digital sensor (48). The digital image file is created by the digital sensor by converting photons to electrons. The image file is sent to either the signal processing circuit (DSP) (24) or the CPU (28). The image file is then sent to storage, typically a flash memory apparatus (36). In some cases, the image file is sent to an ASIC or cache for temporary storage before the DSP or CPU will process the file. In addition, the CPU may contain circuitry including an analog to digital converter, a digital to analog converter and a programmable gain amplification circuit. The CPU may be a microprocessor or a SoC.

In order to process the file, the CPU and DSP store data and instructions in EEPROM (42), EPROM (40), SDRAM (38) and DBMS (22) components, retrieve the data and instructions, process the file and send the processed file to storage. The circuitry uses an analog to digital (A to D) converter (33) and a digital to analog converter (DAC) (34). The aggregated camera circuitry may be contained in a single system on a chip (SoC) device, which integrates a set of microcircuits and memory devices with specific functionality.

The camera also uses a switch input circuit (30) to control the camera functions and an image alteration detection data processing circuit (20) to process the image. The image is viewed in a display, typically an LED or LCD on the back of the camera, which is controlled by a display circuit (32). The display circuit may contain its own DSP to process and filter image files. The camera also uses a wireless communication circuit (26) to communicate wirelessly with outside devices. The wireless circuit may be Wi-Fi (802.11 b/g/n), Bluetooth, 3G or 4G LTE. For example, the camera may upload image files to other devices or may download image files, software or algorithms from other devices. In another implementation, the camera may use USB 1.0, 2.0 or 3.0, Fire wire or Thunderbolt communications connections.

Figure 2:
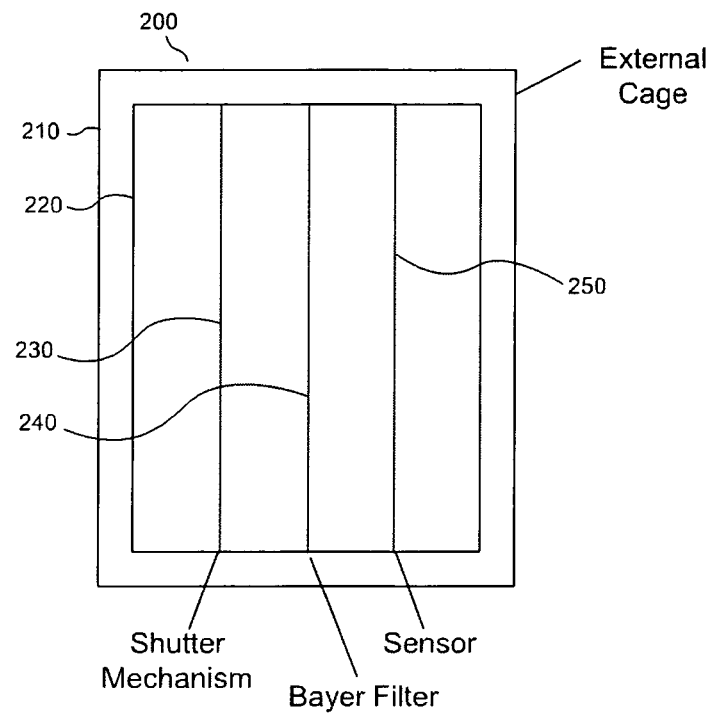
FIG. 2 is a schematic drawing of removable cage comprising a camera shutter and sensor.
Figure 3:
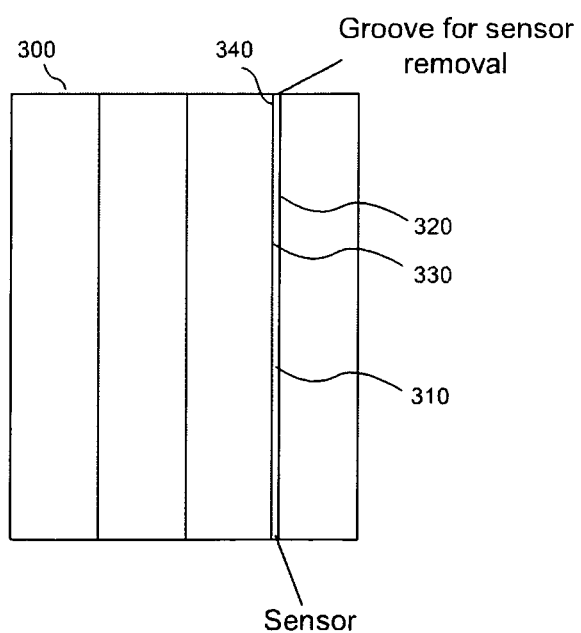
FIG. 3 is a schematic drawing showing a cage with a highlighted sensor component.
Figure 4:
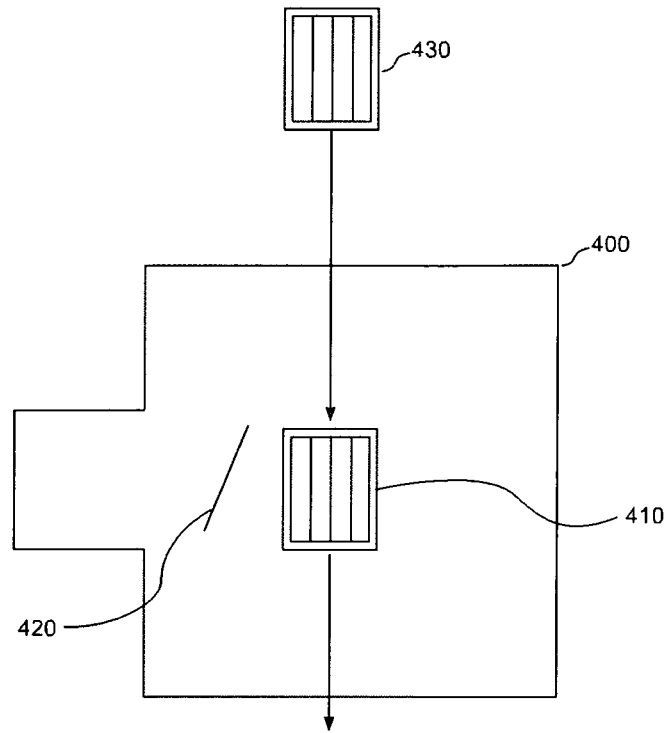
FIG. 4 is a schematic drawing showing a removable and replaceable sensor and shutter cage.

FIG. 2 is a schematic drawing of a removable cage mechanism (200) comprising a camera shutter and sensor. The external cage (210) is shown with an internal module (220) to hold the shutter mechanism (230), the Bayer filter (240) and the sensor (250). FIG. 3 is a schematic drawing showing a cage with a highlighted sensor component. The cage (300) is shown with the left part of the groove (330), the right part of the groove (320) and the sensor (310). The sensor is removed at the top of the groove assembly (340). FIG. 4 shows the sensor and shutter cage (430) being installed in a position (410) in the camera (400) relative to the mirror mechanism (420).

Figure 5:
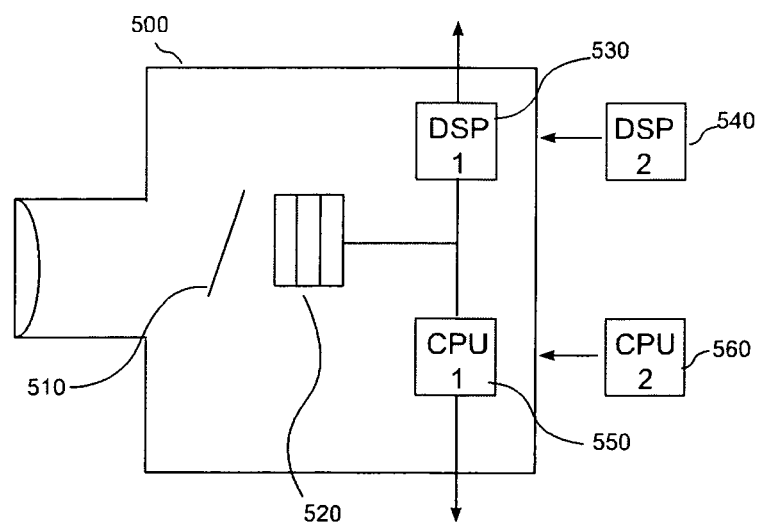
FIG. 5 is a schematic drawing showing the removable and replaceable DSP and CPU in a camera.
Figure 6:
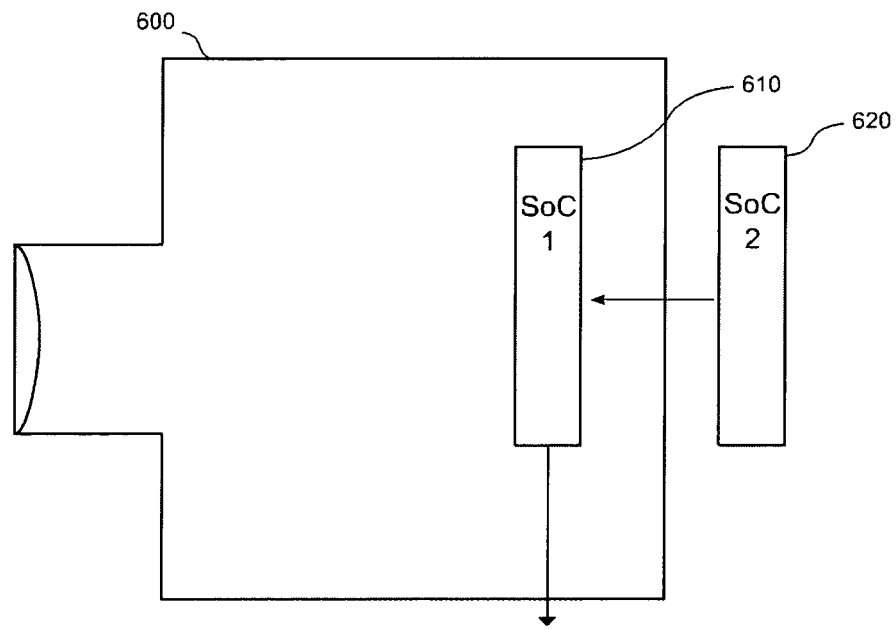
FIG. 6 is a schematic drawing showing the removable and replaceable SoC.

FIG. 5 is a schematic drawing showing the removable DSP and CPU in a camera. The camera (500) is shown with a mirror mechanism (510) and the sensor and shutter mechanism (520). The camera DSP 1 (530) is removed and a DSP 2 (540) is installed. Similarly, the camera CPU 1 (550) is removed and a CPU 2 (560) is installed. FIG. 6 shows a removable and replaceable SoC. The camera (600) has a SoC 1 (610) which is removed and replaced by an external SoC 2 (620).

Figure 7:
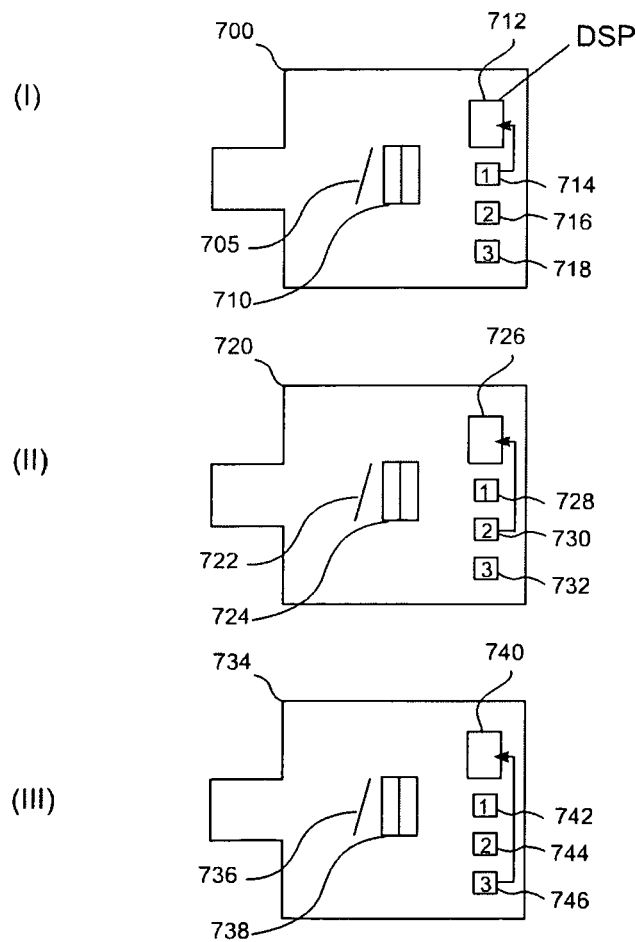
FIG. 7 is a schematic drawing showing the three phases of a DSP filtration with different filtration programs.

FIG. 7 shows the three phases of a DSP filtration with different filtration programs. In the first phase, the camera (700) shown with mirror (705) and sensor (710) mechanisms uses a DSP (712) to process one of three filtration programs (714, 716 and 718). In the first phase, the first filtration program is applied. In the second phase, which shows the mirror (722) and sensor (724) mechanisms, the second filtration program (728, 730 and 732) is applied (at 730). In the third phase, which shows the mirror (736) and sensor (738) mechanisms, the third filtration program (742, 744 and 746) is applied (at 746).

Figure 8:
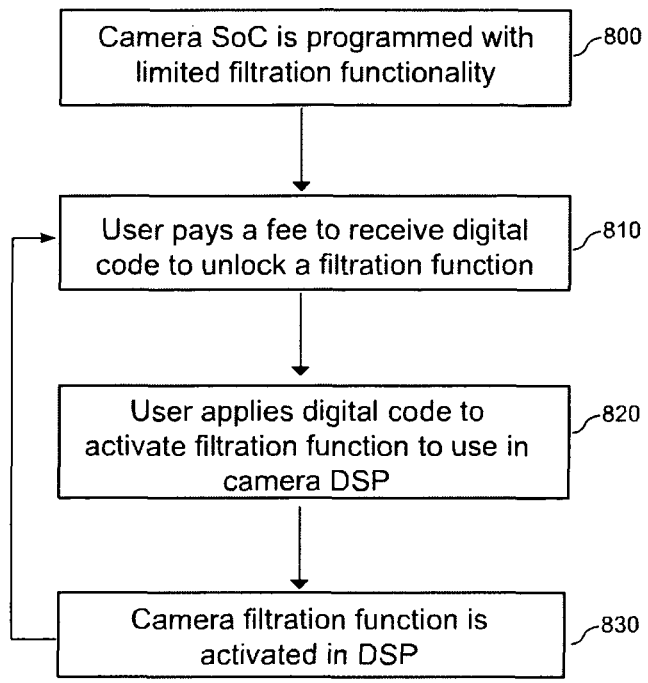
FIG. 8 is a flow chart showing the process of unlocking a filtration camera function.

FIG. 8 shows the process of unlocking a filtration camera function. After the camera SoC is programmed with limited functionality (800), a user pays a fee to receive a digital code to unlock a filtration function (810). The user then applies the digital code to activate the filtration function to use in the camera DSP (820) and the camera filtration function is activated in the DSP (830).

Figure 9:
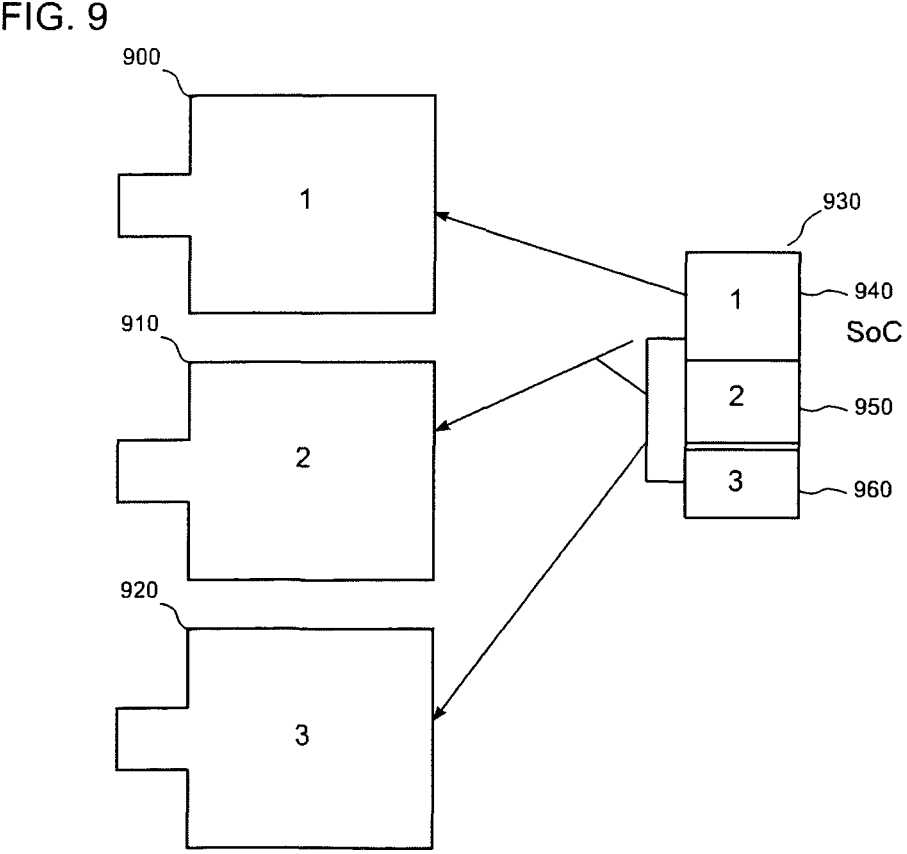
FIG. 9 is a schematic drawing showing the adding of functions of an SoC for three different camera models.

FIG. 9 shows the process of adding functions of an SoC for three different camera models. In the first camera (900), the SoC (930) consists of the first set of circuits (940). In the second camera (910), the SoC includes the first and second set of circuits (940 and 950). In the third camera (920), the SoC includes the three combined set of circuits (940, 950 and 960). This approach has the advantage of allowing the camera models to use the same chipset, with a lesser camera model disabled from specific circuitry.

Figure 10:
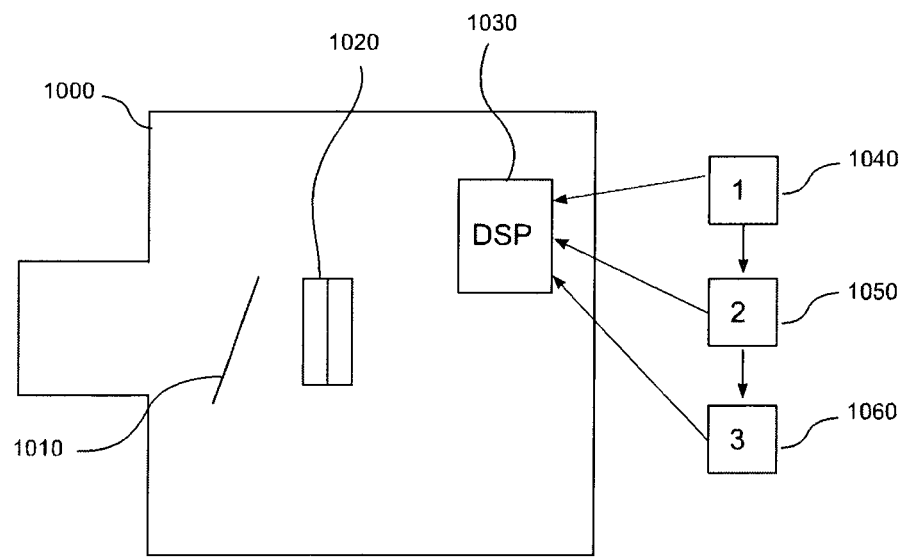
FIG. 10 is a schematic drawing showing three programs downloaded to a camera DSP.

FIG. 10 shows three programs downloaded to a camera DSP. The camera (1000) is shown with mirror (1010) and sensor (1020) mechanisms. The three software programs (1040, 1050 and 1060) are downloaded to the DSP (1030). The programs are shown downloaded in a specific sequence, but it is not necessary to have the programs downloaded in this sequence.

Figure 11:
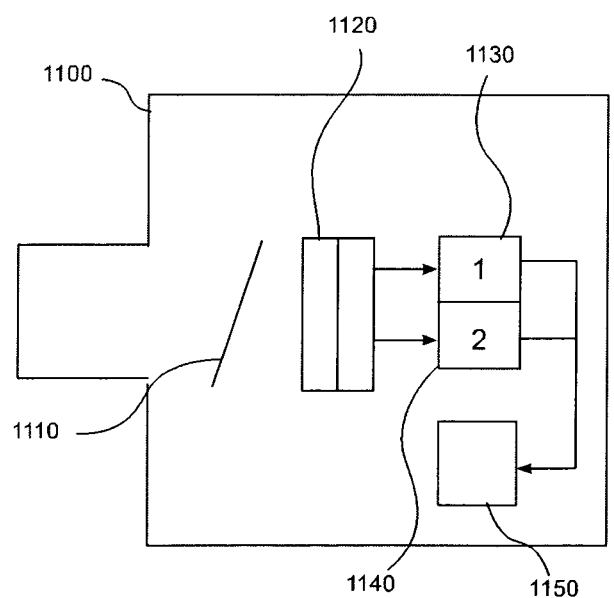
FIG. 11 is a schematic drawing showing a two-core DSP in a camera.

FIG. 11 shows a two-core DSP in a camera. The camera (1100) is shown with mirror (1110) and sensor (1120) mechanisms. The digital image files are sent from the sensor to the two DSPs (1130 and 1140) in alternating order. Once processed, the image files are sent to storage (1150). The system may use two DSPs or a multi-core DSP.

Figure 12:
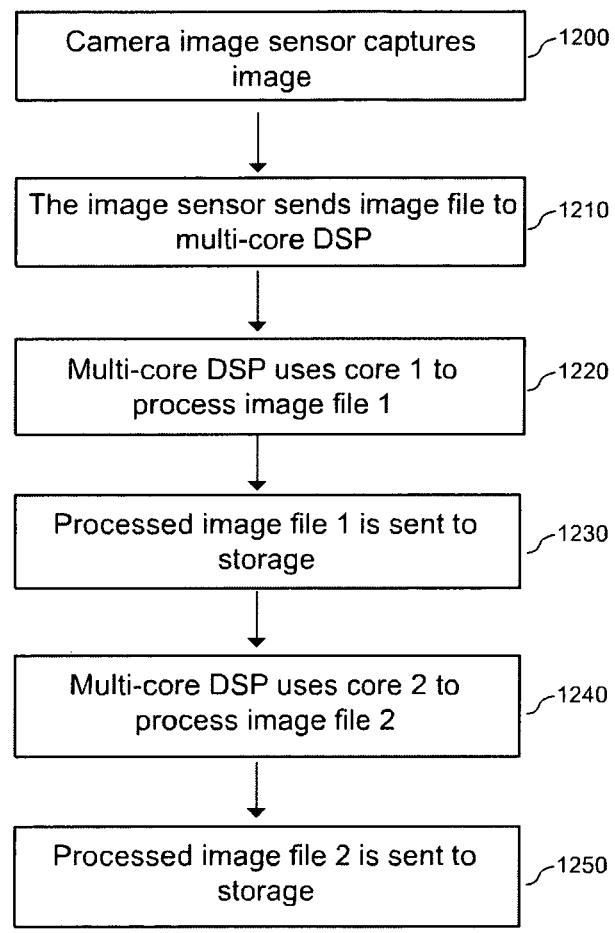
FIG. 12 is a flow chart showing a camera processing image files with a multi-core DSP.

FIG. 12 shows the sequence of processing of image files with a multi-core DSP. After the camera image sensor captures an image (1200), the image sensor sends an image file to a multi-core DSP (1210). The multi-core DSP uses core 1 to process image file 1 (1220) and the processed image is sent to storage (1230). The multicore DSP then uses core 2 to process image file 2 (1240) and the processed image file 2 is sent to storage (1250). The example of a two core multi-core DSP is merely illustrative because multi-core DSPs may consist of several cores. In this case, each core is provided with a different file to process in a sequence of files.

Figure 13:
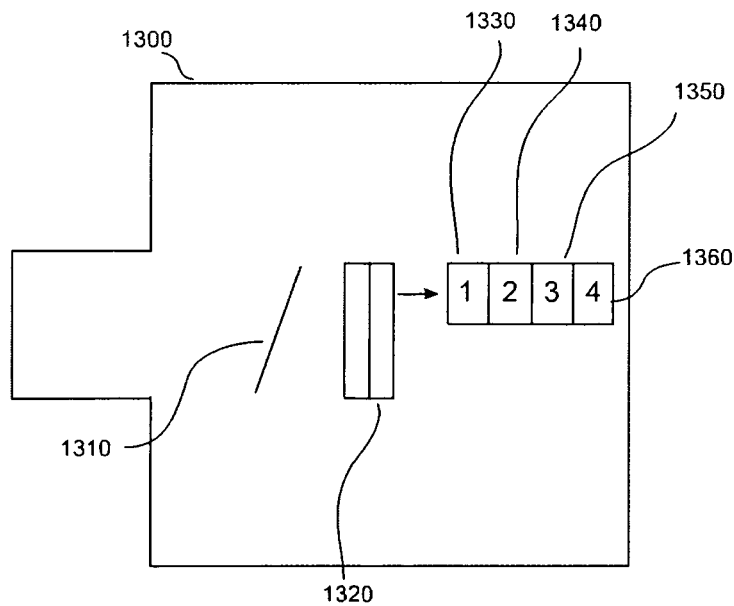
FIG. 13 is a schematic drawing showing a sequential processing in a DSP.

FIG. 13 shows a sequential process in a DSP. In this example, the camera (1300) is shown with a mirror (1310) and sensor mechanism (1320) transferring image files to be processed in several phases in the DSP. A single file may be processed in a sequence of four phases (1330, 1340, 1350 and 1360).

Figure 14:
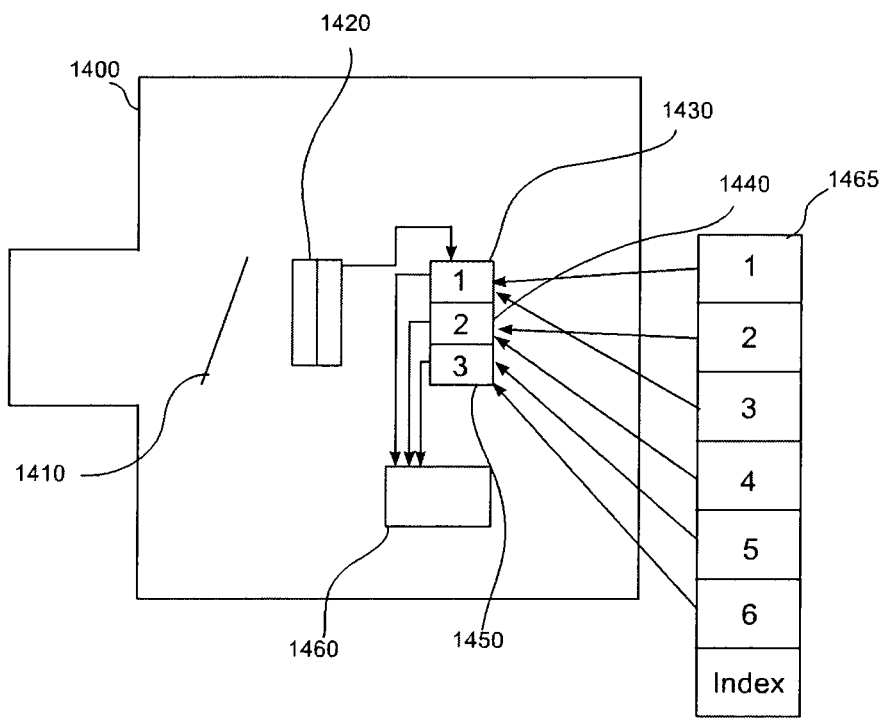
FIG. 14 is a schematic drawing showing three camera DSPs processing six external software programs.

FIG. 14 shows three camera DSPs processing six external software programs. In this example, the camera (1400) is shown with mirror (1410) and sensor (1420) apparatuses forwarding files to the DSPs (1430, 1440 and 1450). The DSPs obtain software programs (1465) from an external computer. As shown, programs 1 and 2 are downloaded to DSP 1 (1430), programs 3 and 4 are downloaded to DSP 2 (1440) and programs 5 and 6 are downloaded to DSP 3 (1450). Once the image files are processed, they are sent to storage (1460).

Figure 15:
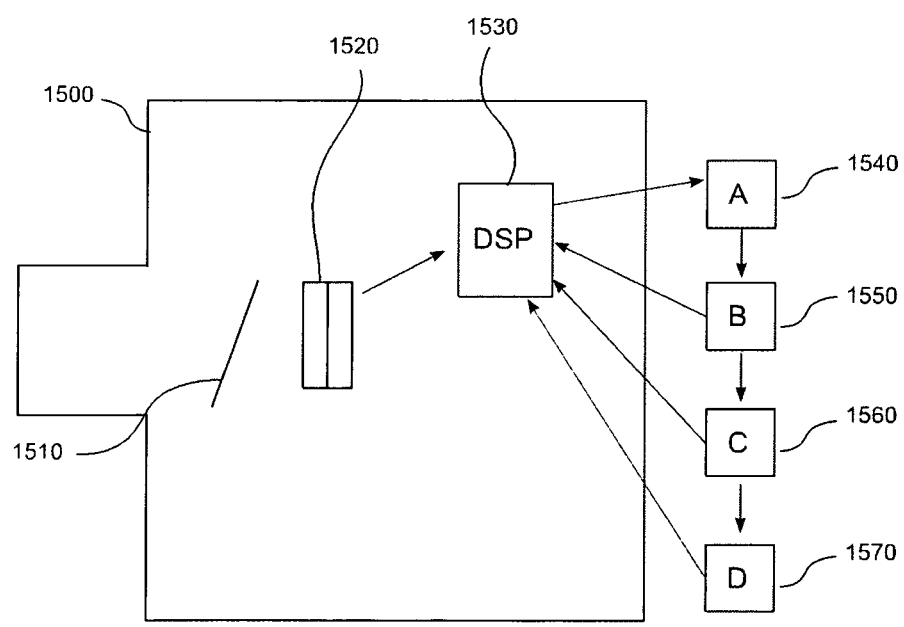
FIG. 15 is a schematic drawing showing an external network providing algorithms for a camera DSP.

FIG. 15 shows an external network providing algorithms for a camera DSP. In this example, the camera (1500) is shown with mirror (1510) and sensor (1520) apparatuses sending an image file to the DSP (1530). The DSP receives a set of algorithms, A-D (1540, 1550, 1560 and 1570) to the DSP to process image files.

FIG. 16 shows the process of using a remote computer to send an algorithm to a camera DSP to perform a function. After the camera sends an unfiltered image file to a remote computer (1600), the remote computer receives an unfiltered image file and analyzes the file (1610). The remote computer selects a DSP algorithm (1620) and sends the algorithm to the camera (1630). The user activates the camera to capture a new image (1640) and the camera activates the DSP algorithm to process the new image file (1650). The new image is optimized (1660).

FIG. 17 shows the process of using a remote computer to filter a digital image file from a camera and upgrading the camera DSP to optimize work flow. Once the camera sends an unfiltered image file to a remote computer (1700), the remote computer receives the unfiltered image file and analyzes the file (1710). The remote computer selects a DSP algorithm and sends the algorithm to the camera (1720). The user activates the camera to capture a new image (1730) and the camera adjusts settings, such as shutter speed and aperture (1740). The camera captures the new image (1750) and the computer activates a feature in the DSP (1760). The camera then takes a picture with the upgraded DSP functionality (1770).

Figure 18:
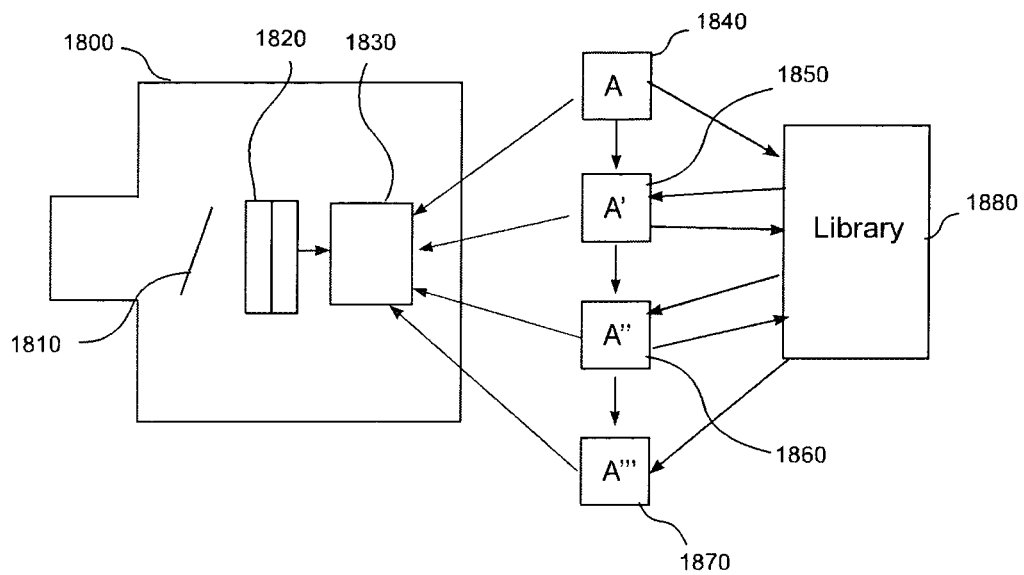
FIG. 18 is a schematic drawing showing versions of an algorithm from an external computer library downloaded to a camera DSP.

FIG. 18 shows versions of an algorithm from an external computer library downloaded to a camera DSP. The camera (1800) is shown with mirror (1810) and sensor (1820) mechanisms sending an image file to the DSP (1830). The external computer library (1880) is shown developing different versions of an algorithm, A-A''' (1840, 1850, 1860 and 1870). As the algorithm develops each new version, it is downloaded to the camera DSP for application with successive image files in the photographic work flow.

Figure 19:
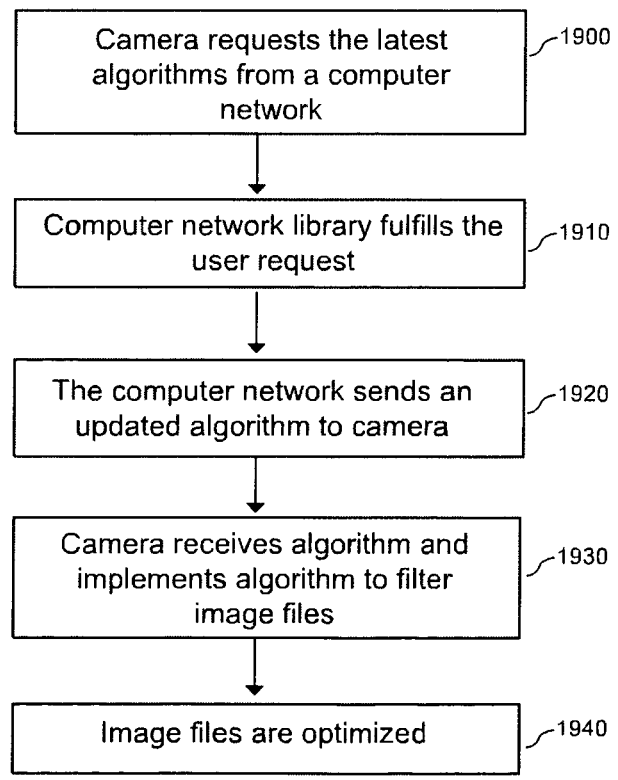
FIG. 19 is a flow chart showing the process of using a computer network to send updated algorithms to a camera.

FIG. 19 shows the process of using a computer network to send updated algorithms to a camera. After a camera requests the latest algorithms from a computer network (1900), the computer network library fulfills the user request (1910). The computer network sends an updated algorithm to the camera (1920) and the camera receives the algorithm and implements the algorithm to filter image files (1930). The image files are then optimized (1940).

Figure 20:
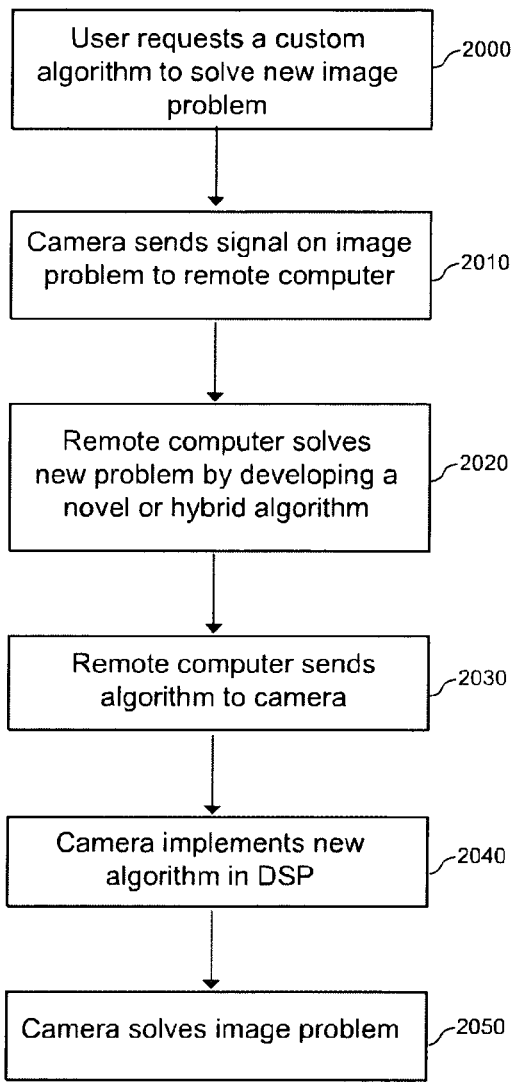
FIG. 20 is a flow chart showing the process of using a remote computer to send a custom algorithm to a camera.

FIG. 20 shows the process of using a remote computer to send a custom algorithm to a camera. Once the user requests a custom algorithm to solve a new image problem (2000), the camera sends a signal on the image problem to a remote computer (2010). The remote computer solves the new problem by developing a novel or hybrid algorithm (2020) and sends the algorithm to the camera (2030). The camera implements the new algorithm in the DSP (2040) and the camera solves the image problem (2050).

Figure 21:
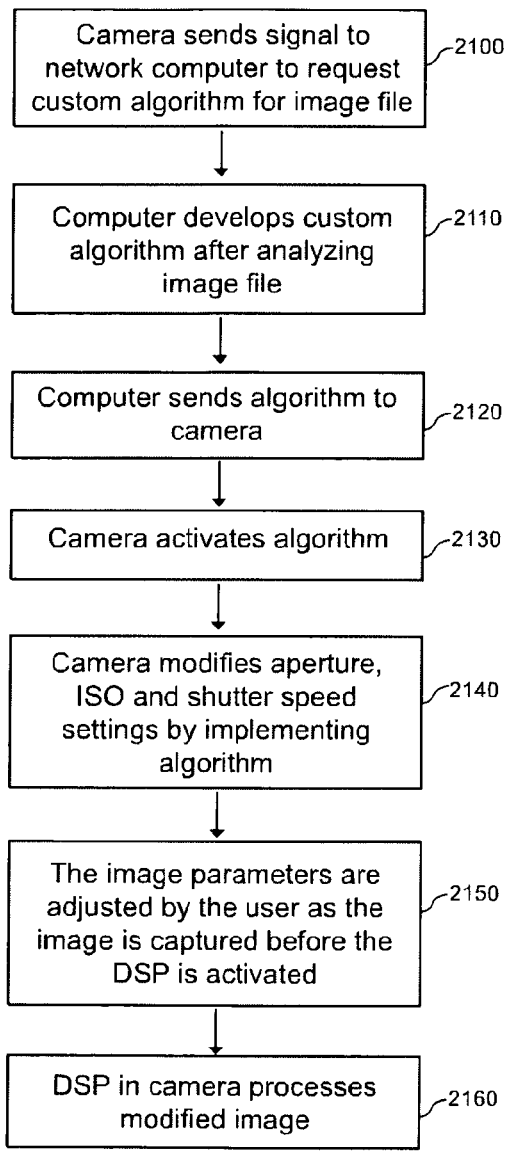
FIG. 21 is a flow chart showing the process of using a computer to develop a custom algorithm to apply to a camera.

FIG. 21 shows the process of using a computer to develop a custom algorithm to apply to a camera. After the camera sends a signal to a network computer to request a custom algorithm for an image file (2100), the computer develops a custom algorithm after analyzing the image file (2110). The computer sends the algorithm to a camera (2120) and activates the algorithm (2130). The camera modifies the aperture, ISO and shutter speed settings by implementing the algorithm (2140) and the image parameters are adjusted by the user as the image is captured before the DSP is activated (2150). The camera DSP then processes the modified image (2160).

Figure 22:
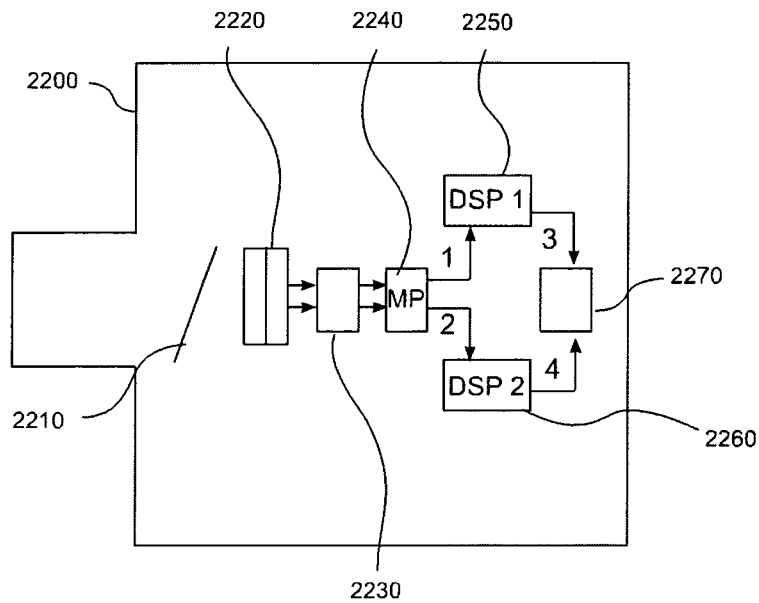
FIG. 22 is a schematic drawing showing a multi-tasking camera circuitry with two DSPs.

FIG. 22 shows a multi-tasking camera circuitry with two DSPs. The camera (2200) is shown with mirror (2210) and sensor (2220) mechanisms. The image file is sent from the sensor to an ASIC (2230) and then to the camera microprocessor (CPU) (2240). The CPU then forwards one file to DSP 1 (2250) and forwards a second file to DSP 2 (2260). File one is then processed by DSP 1 and file two is then processed by DSP 2. The processed image files are then sent to storage (2270) in the order received.

Figure 23:
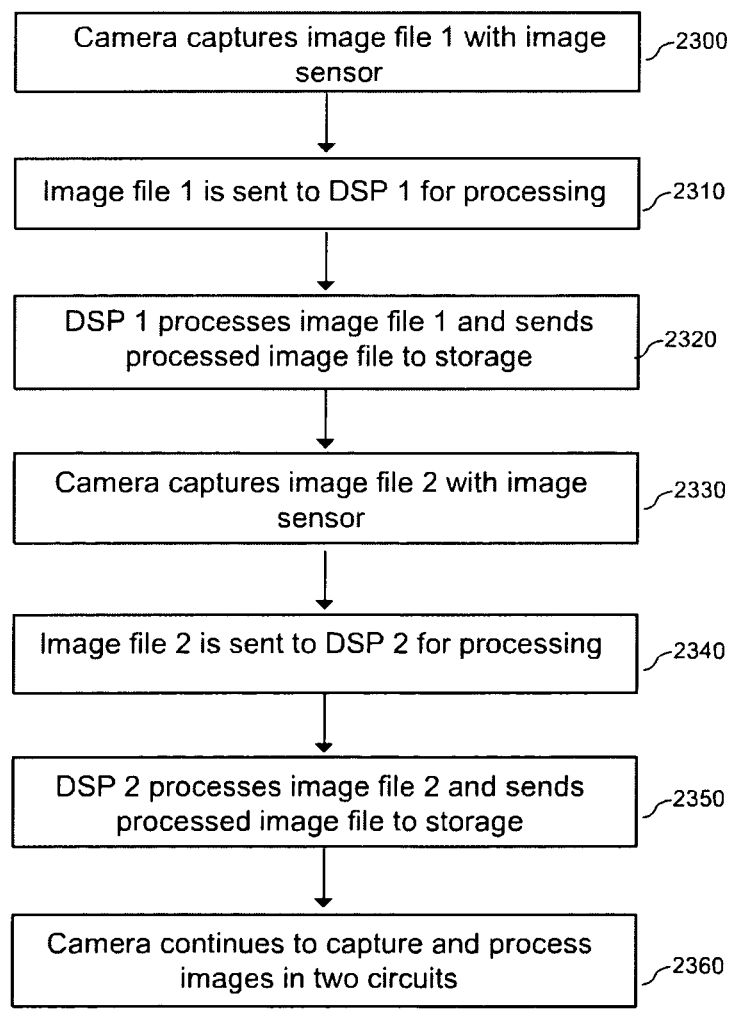
FIG. 23 is a flow chart showing the process of using two DSPs to process image files.

FIG. 23 shows the process of using two DSPs to process image files. Once the camera captures image file 1 with an image sensor (2300), image file 1 is sent to DSP 1 for processing (2310). DSP 1 processes image file 1 and sends the processed image file to storage (2320). The camera then captures image file 2 with the image sensor (2330) and image file 2 is sent to DSP 2 for processing (2340). DSP 2 processes image file 2 and sends processed image file to storage (2350). The camera continues to capture and process images in two circuits (2360).

Figure 24:
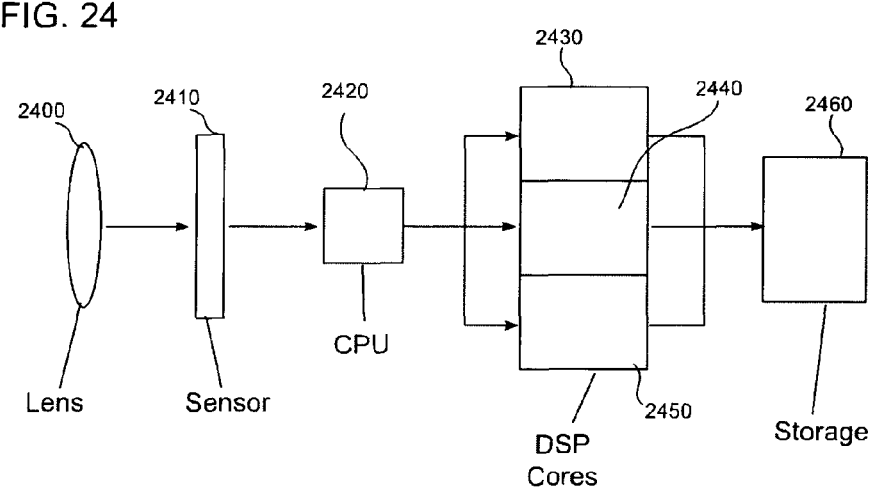
FIG. 24 is a schematic drawing showing the pathway of camera circuitry components.
Figure 25:
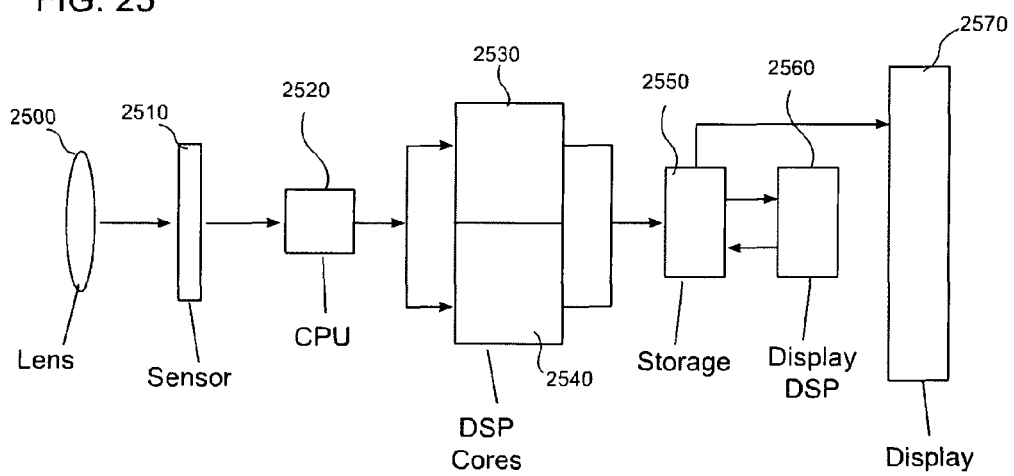
FIG. 25 is a schematic drawing showing the operation of a display DSP to process an image file as a supplement to two DSP cores.
Figure 26:
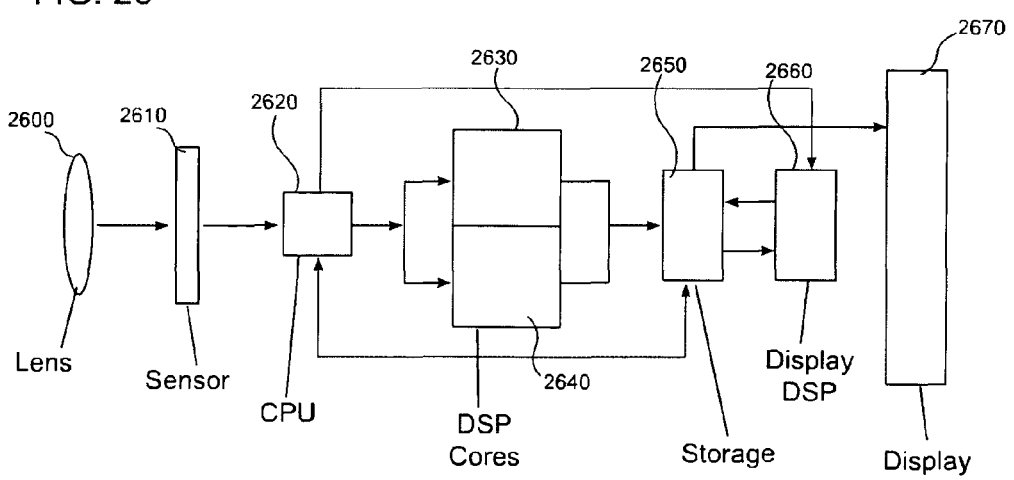
FIG. 26 is a schematic drawing showing the process of using a CPU to analyze and image file from storage and using the display DSP to supplement DSP cores.

FIGS. 24-26 show the pathway of camera circuitry components to process image files with at least two DSP cores. In FIG. 24, the drawing shows a lens (2400) forwarding an optical image to a sensor (2410), which forwards the image files to a CPU (2420). The CPU forwards the image files to three DSP cores (2430, 2440 and 2450) in a sequence and the corrected image files are forwarded to storage (2460). In FIG. 25, the lens (2500) forwards an optical image to a sensor (2510), which forwards the image files to a CPU (2520), which forwards the image files to two DSP cores (2530 and 2540) in sequence, which then forwards the corrected digital files to storage (2550). The display DSP (2560) then receives the image files from storage and filters the image file further and returns the filtered image file to storage. The user may also view the image file from storage (2570). This model is useful in order to provide some minor filtration to image files in real time as they are captured and then provide additional image filtration as preferred. In FIG. 26, the lens (2600) forwards an optical image to a sensor (2610), which forwards the image files to the CPU (2620), which forwards the image files to two DSP cores (2630 and 2640), to the display DSP (2660) and directly to storage (2650). The filtered image files from the DSPs are then sent to storage. The camera display (2670) may access the image files from storage. The display DSP (2660) accesses and filters image files and sends the corrected image files to storage. This model of using the camera DSPs allows for multi-tasking and multi-processing and increases camera efficiency appreciably.

Figure 27:
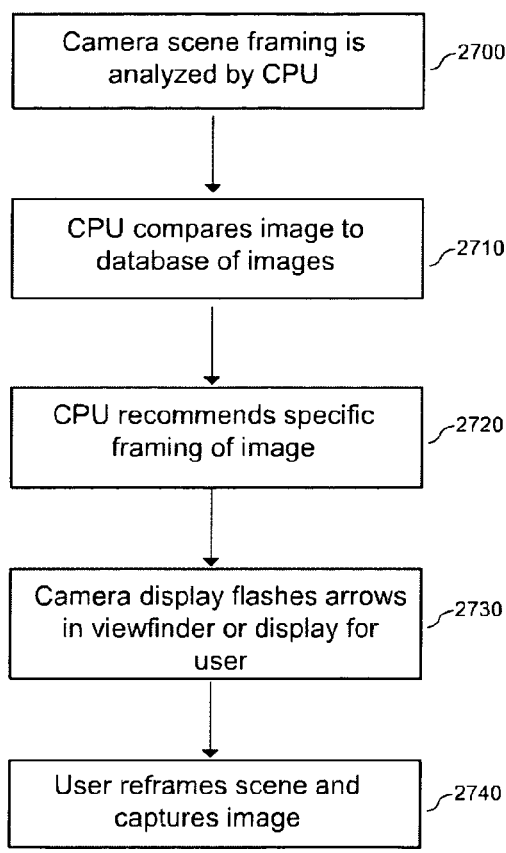
FIG. 27 is a flow chart showing the use of a camera CPU to process a recommendation to reframe a scene.

FIG. 27 shows the use of a camera CPU to process a recommendation to reframe a scene. Once the camera scene framing is analyzed by the CPU (2700), the CPU compares the image to a database of images (2710). The CPU recommends specific framing of the image (2720) and the camera display flashes arrows in the viewfinder or display for the user (2730). The user makes changes in the framing of the scene by using the recommendations in the viewfinder or display and captures the image (2740).

Figure 28:
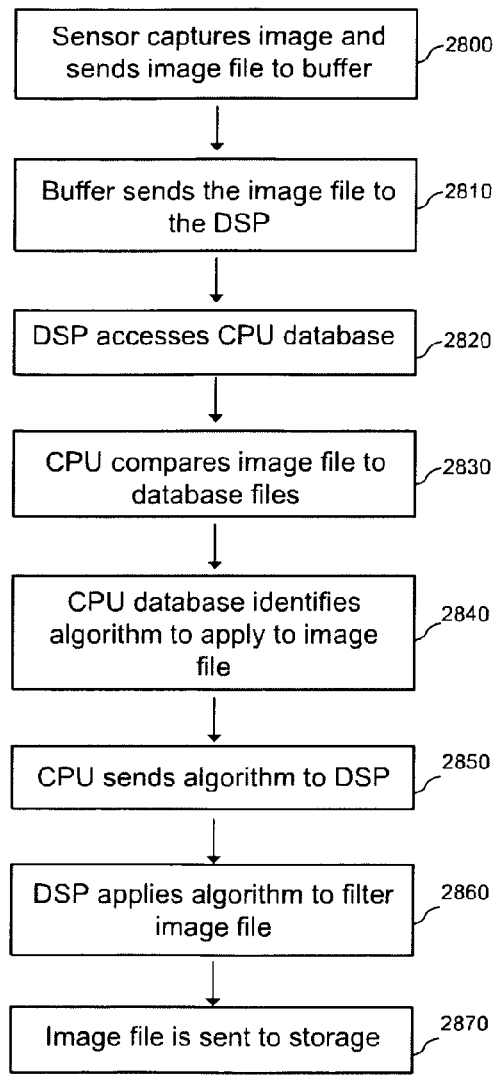
FIG. 28 is a flow chart showing the process of using camera circuitry to process an image file.

FIG. 28 shows the process of using camera circuitry to process an image file. After the sensor captures an image and sends the image file to a buffer (2800), the buffer sends the image file to the DSP (2810). The DSP accesses the CPU database (2820) and the CPU compares the image file to the database files (2830). The CPU database identifies the algorithm to apply to the image file (2840). The CPU then sends an algorithm to the DSP (2850) and the DSP applies the algorithm to filter the image file (2860). The image file is then sent to storage (2870).

Figure 29:
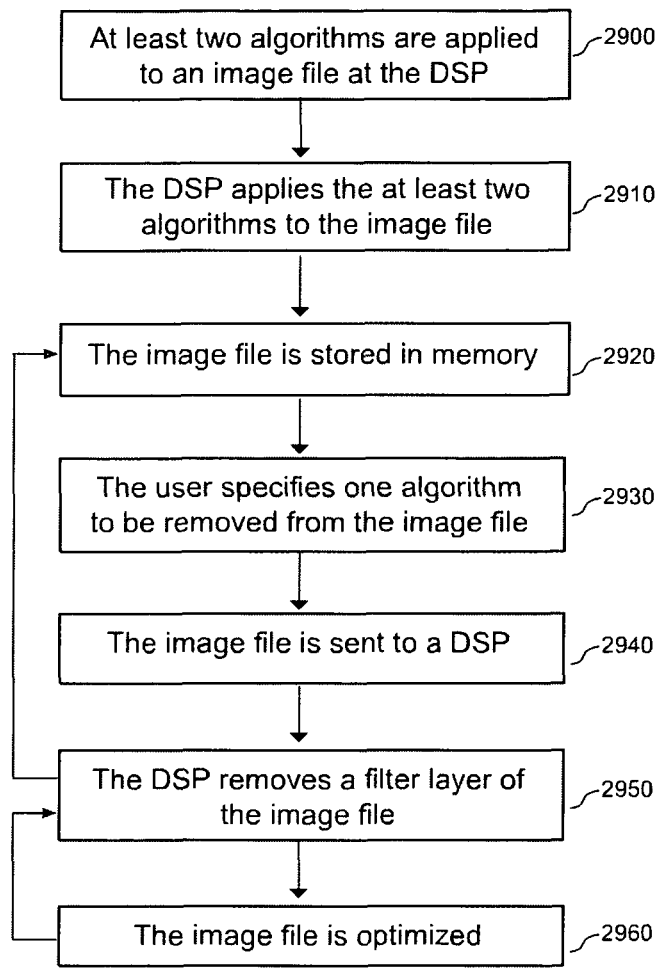
FIG. 29 is a flow chart showing the process of applying algorithms to an image file with a camera DSP.

FIG. 29 shows the process of applying algorithms to an image file with a camera DSP. First, at least two algorithms are applied to an image file at the DSP (2900). The DSP applies the at least two algorithms to the image file (2910) and the image file is stored in memory (2920). The user specifies one algorithm to be removed from the image file (2930) and the image file is sent to a DSP (2940). The DSP then removes a filter layer of the image file (2950) and the image file is stored. The process repeats by specifying an algorithm to be removed and the DSP continues to remove a filter layer of the image file until the image file is optimized (2960).

Figure 30:
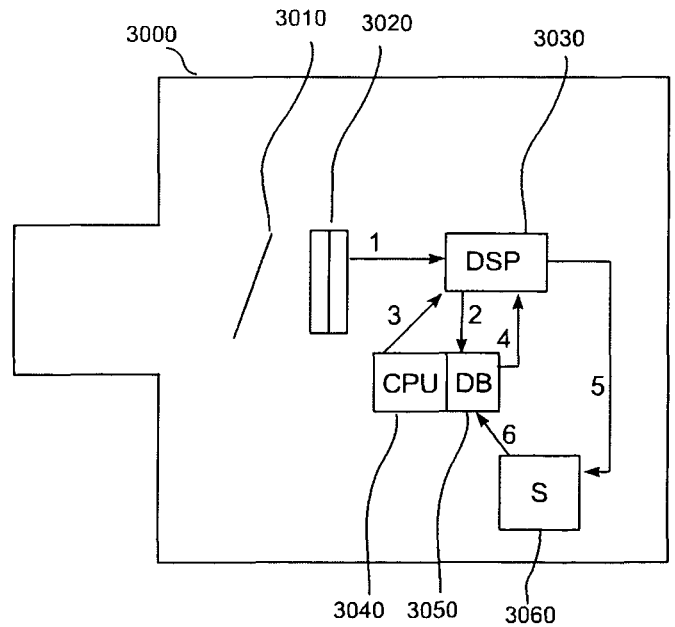
FIG. 30 is a schematic diagram showing the sequence of steps of algorithms optimizing an image file with a CPU and DSP.

FIG. 30 shows the sequence of steps of algorithms optimizing an image file with a CPU and DSP. The camera (3000) is shown with mirror (3010) and sensor (3020) mechanisms. The image file is sent from the sensor to the DSP (3030). The DSP sends a request to the database (3050) in the CPU. The CPU (3040) then sends a signal to the DSP and the database sends the correct algorithm to apply to the image file. The DSP forwards the corrected image file to storage (3060). The updated image file is then sent to the database for later access.

Figure 31:
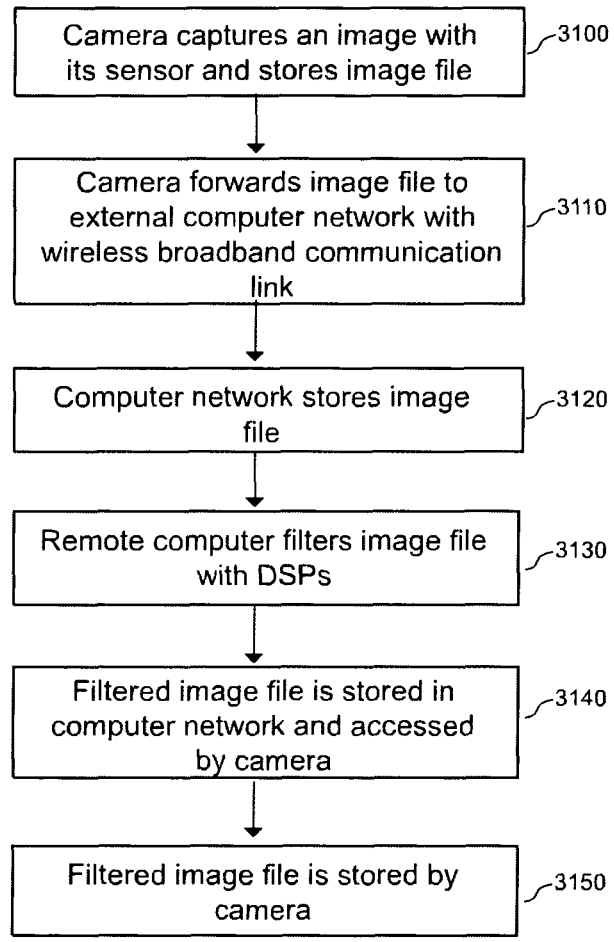
FIG. 31 is a flow chart showing the process of using a remote computer to filter an image file.

FIG. 31 shows the process of using a remote computer to filter an image file. After the camera captures an image with its sensor and stores the image file (3100), the camera forwards the image file to an external computer network with a wireless broadband communications link (3110). This is done by using the camera's communication circuitry. The computer network stores the image file (3120) and the remote computer filters the image file with DSPs (3130). The filtered image file is stored in the computer network and accessed by the camera (3140). The filtered image file is then stored by the camera (3150).

Figure 32:
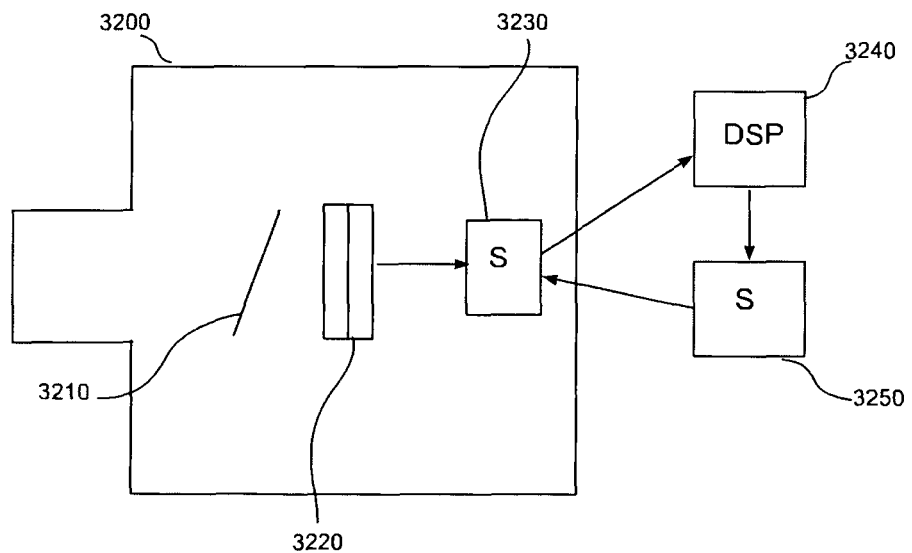
FIG. 32 is a schematic drawing showing the process of capturing and storing an image in camera and sending the image file to an external computer for filtration and storage.

FIG. 32 shows the process of capturing and storing an image in camera and sending the image file to an external computer for filtration and storage. The camera (3200) is shown with the mirror (3210) and shutter (3220) mechanisms sending an image file to storage (3230). The image file is then sent to an external computer DSP (3240) for filtration, which then sends the corrected image file to external storage (3250). The corrected image file is then sent back to the camera for storage.

Figure 33:
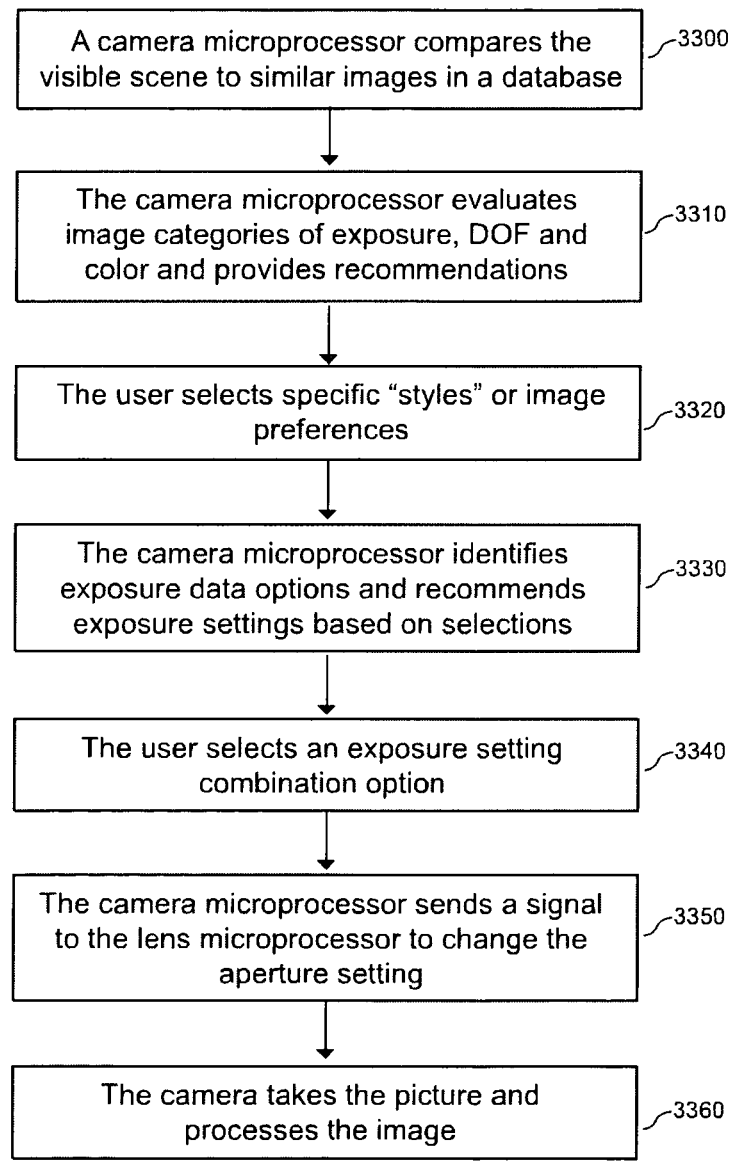
FIG. 33 is a flow chart showing the process of using a camera microprocessor to modify exposure settings.

FIG. 33 shows the process of using a camera microprocessor to modify exposure settings. The microprocessor is interchangeable with the CPU. After the camera MP compares the visible scene to similar images in a database (3300), it evaluates the image categories of exposure, DOF and color and provides recommendations (3310). The user selects specific "styles" or image preferences (3320) and the camera MP identifies exposure data options and recommends exposure settings based on selections (3330). The user then selects an exposure setting combination option (3340), the camera MP sends a signal to the lens MP (or CPU) to change the aperture setting (3350), the camera takes the picture and processes the image (3360).

Figure 34:
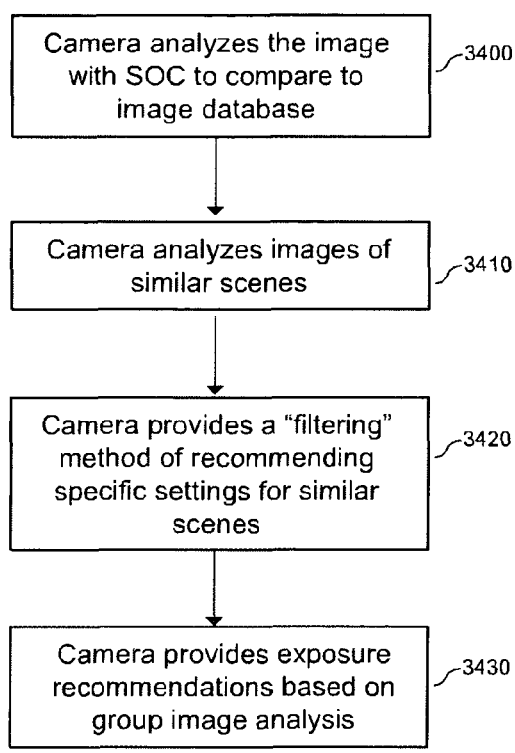
FIG. 34 is a flow chart showing the process of camera analysis to provide exposure modifications.

FIG. 34 shows the process of camera analysis to provide exposure modifications. After the camera analyzes the image with the SoC to compare to the image database (3400), the camera analyzes the images of similar scenes (3410). The camera provides a "filtering" method of recommending specific settings for similar scenes (3420) and the camera provides exposure recommendations based on group image analysis (3430).

Figure 35:
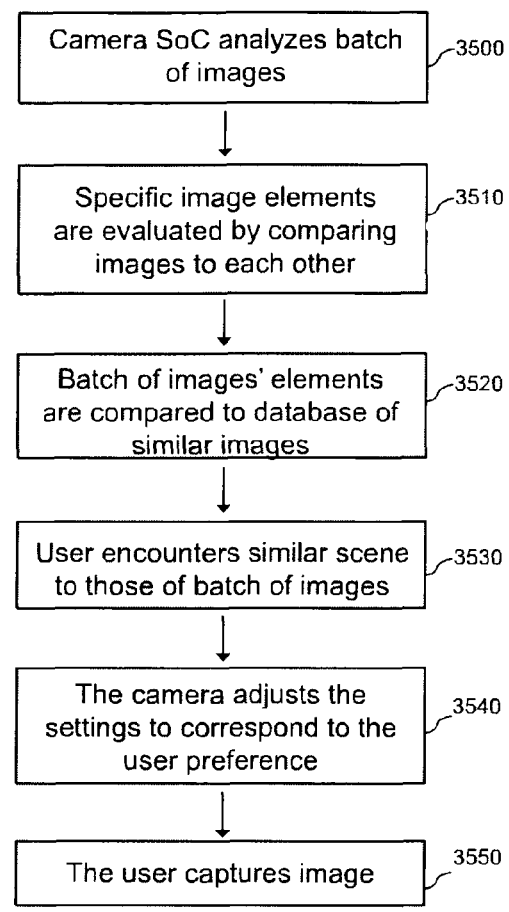
FIG. 35 is a flow chart showing the batch analysis process of a camera.

FIG. 35 shows the batch analysis process of a camera. After the camera SoC analyzes a batch of images (3500), specific image elements are evaluated by comparing images to each other (3510). The batch of images' elements are compared to a database of similar images (3520) and the user encounters a similar scene to those of the batch of images (3530). The camera adjusts the settings to correspond to the user preference (3540) and the user captures the image (3550).

Figure 36:
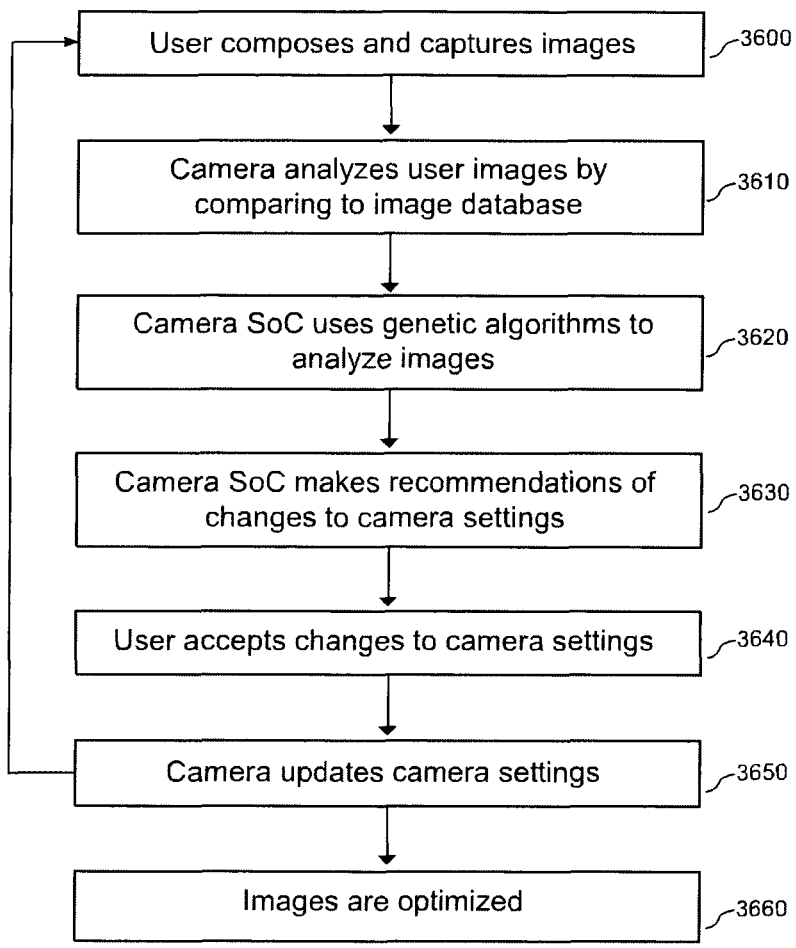
FIG. 36 is a flow chart showing the use of a camera SoC to optimize images.

FIG. 36 shows the use of a camera SoC to optimize images. After the user composes and captures images (3600), the camera analyzes the user images by comparing them to an image database (3610). The camera SoC then uses genetic algorithms to analyze the images (3620) and makes recommendations of changes to camera settings (3630). The user accepts changes to camera settings (3640) and the camera updates the camera settings (3650). The user images are optimized (3660).

Figure 37:
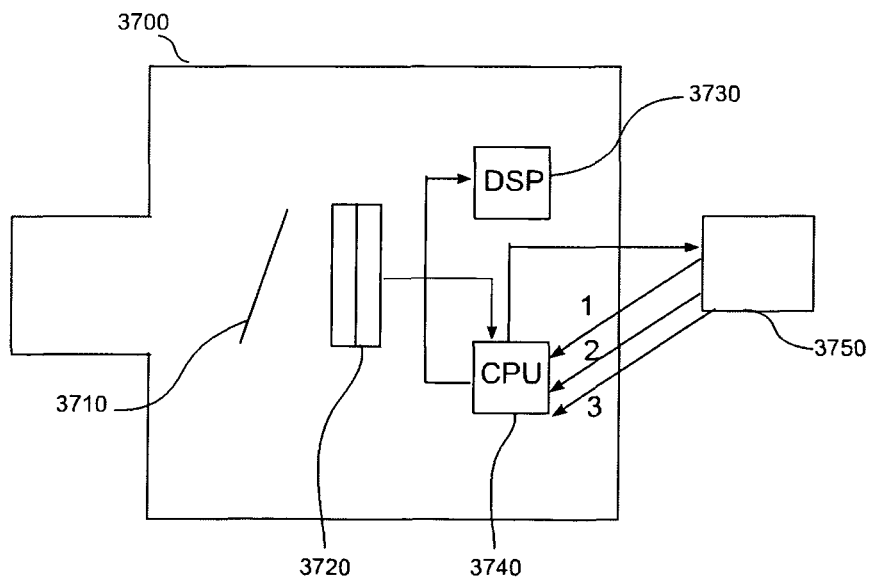
FIG. 37 is a schematic drawing showing how a computer downloads software applications to a camera CPU, and then a DSP, after a request.

FIG. 37 shows how a computer downloads software applications to a camera CPU, and then a DSP, after a request. The camera (3700) is shown with mirror (3710) and sensor (3720) mechanisms. The image files are forwarded to the CPU (3740), which requests specific software applications from an external computer (3750). The external computer then downloads a set of three software applications to the CPU. The CPU then forwards a program to the DSP (3730) to process the image file.

Figure 38:
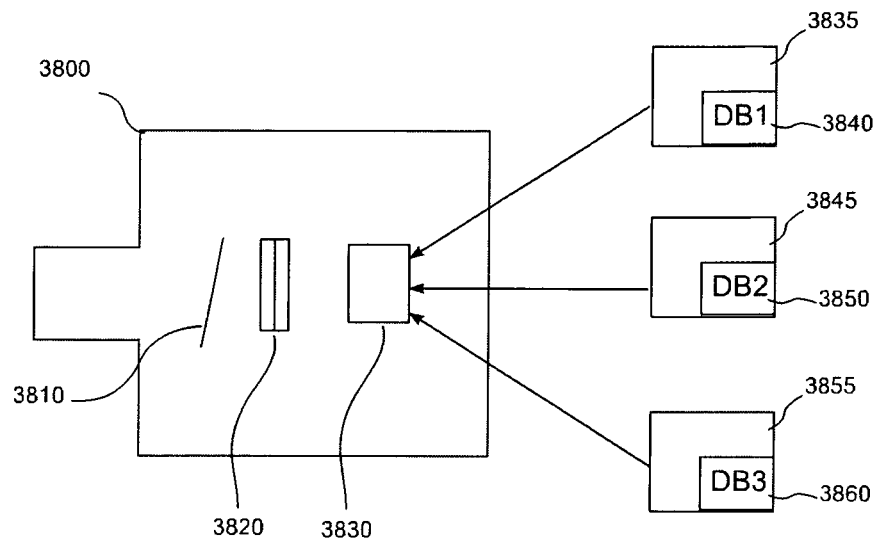
FIG. 38 is a schematic drawing showing the process of downloading three different specialized software applications from external computers to a camera.

FIG. 38 shows the process of downloading three different specialized software applications from external computers to a camera. The camera (3800) is shown with mirror (3810) and sensor (3820) mechanisms. Three external computers (3835, 3845 and 3855) are shown downloading software applications to the camera CPU (3830) by accessing their databases (3840, 3850 and 3860).

Figure 39:
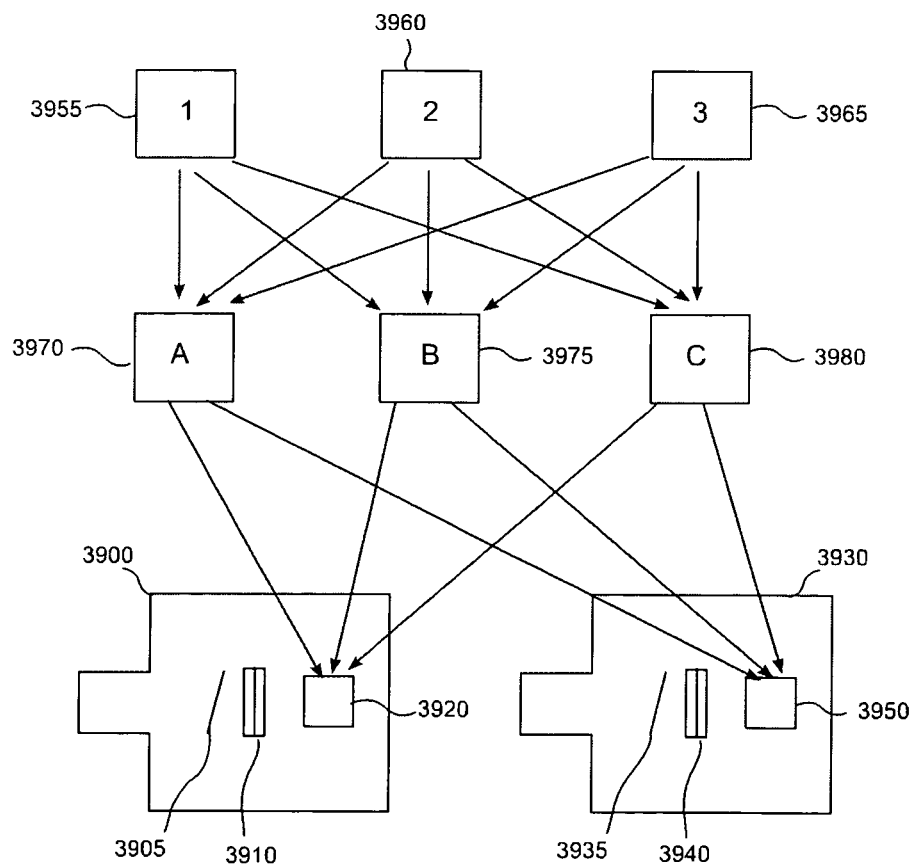
FIG. 39 is a schematic drawing showing the use of three computers uploading programs to a computer database software library and applying the programs to two cameras.

FIG. 39 shows the use of three computers to upload programs to a computer database software library and apply the programs to two cameras. The external computers (1, 2 and 3) (3955, 3960 and 3965) send software programs to a computer software library (A, B and C) (3970, 3975 and 3980). The software programs then download the programs to two cameras (3900 and 3930) shown with mirror, sensor and CPU devices (3905, 3910, 3920, 3935, 3940 and 3950).

Figure 40:
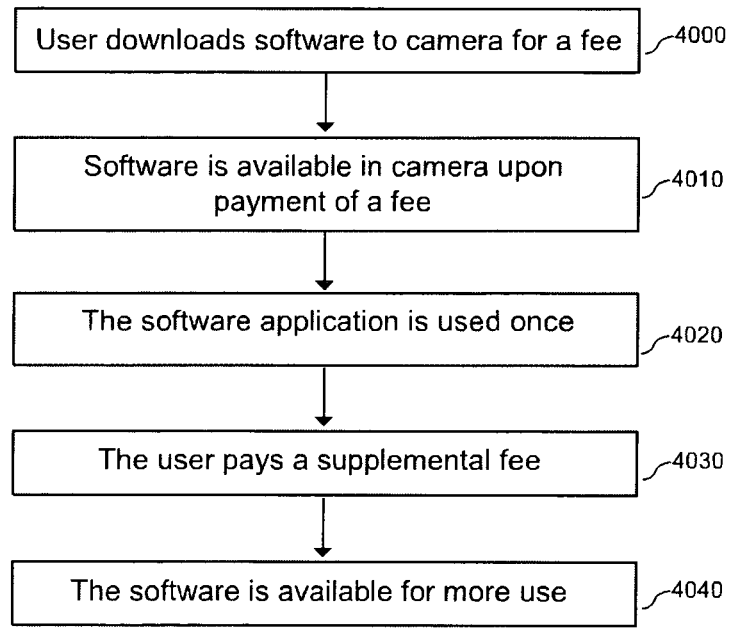
FIG. 40 is a flow chart showing the process of using a software application in a camera that is downloaded from a computer.

FIG. 40 shows the process of using a software application in a camera that is downloaded from a computer. After the user downloads software to the camera for a fee (400), the software is available in the camera (4010). In one implementation, there is no fee required. The software application is used once (4020) and the user pays a supplemental fee (4030) to use the software (4040) further.

Figure 41:
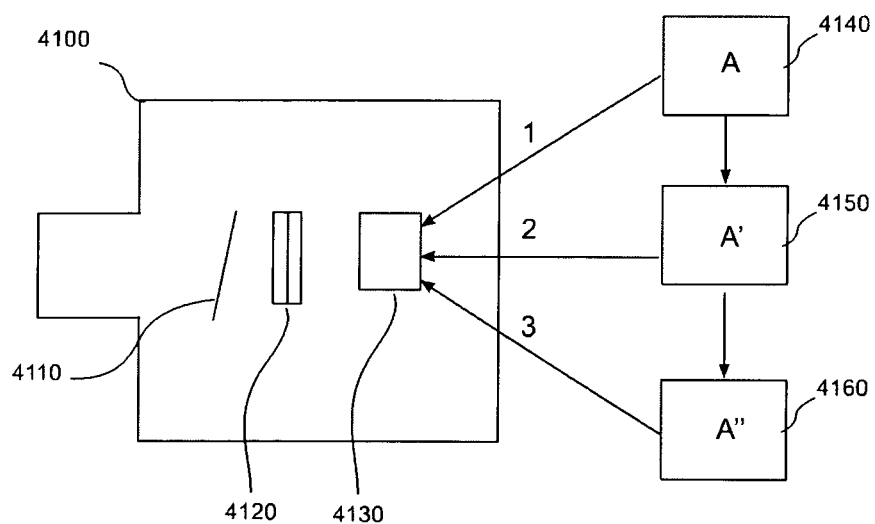
FIG. 41 is a schematic drawing showing an evolving algorithm and each new version sent to update camera software.

FIG. 41 shows an evolving algorithm and each new version sent to update camera software. The camera (4100) is shown with mirror (4110) and sensor (4120) mechanisms. An external computer network downloads a computer algorithm (4140) A to the camera CPU (4130). As the computer network evolves the algorithm, the next version of the algorithm (4150) A' is then downloaded to the camera CPU. A later version of the algorithm (4160) A" is finally downloaded to the camera CPU. Though this example shows only three versions, there is no limit to the number of versions of an algorithm that may be downloaded to a camera.

Figure 42:
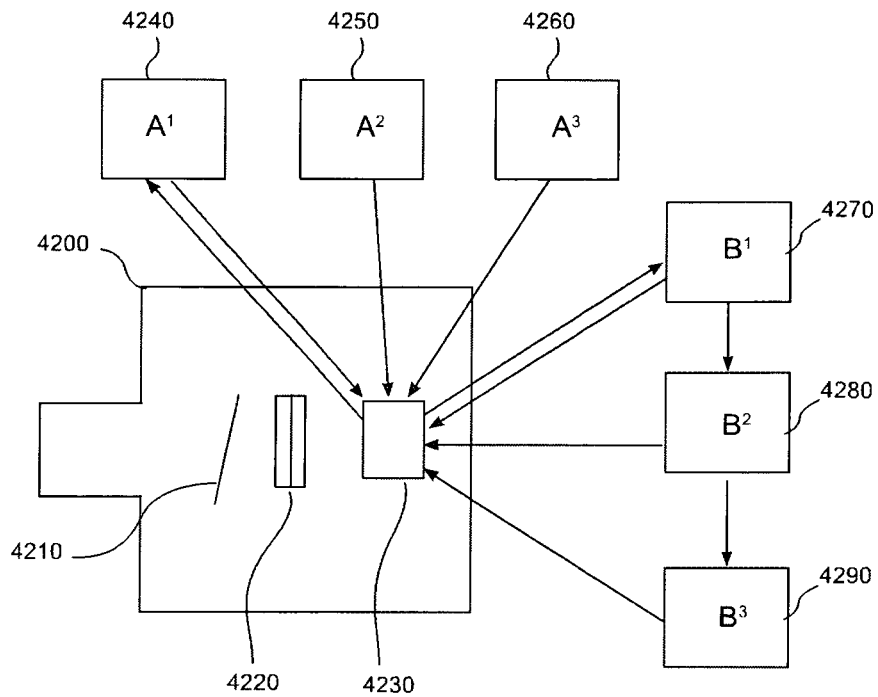
FIG. 42 is a schematic drawing showing a camera accessing two external computers and receiving two versions of software downloads.

FIG. 42 shows a camera accessing two external computers and receiving two versions of software downloads. The camera (4200) is shown with mirror (4210) and sensor (4220) mechanisms. After the camera accesses an external computer network, it downloads a computer algorithm (4240) A1 to the camera CPU (4230). As the computer network evolves the algorithm, the next version of the algorithm (4250) A2 is then downloaded to the camera CPU. A later version of the algorithm (4260) A3 is finally downloaded to the camera CPU. The camera then accesses another algorithm (B1 (4270) from the computer network. As the computer network evolves the algorithm, the next version of the algorithm (4280) B2 is then downloaded to the camera CPU. A later version of the algorithm (4290) B3 is finally downloaded to the camera CPU.

Figure 43:
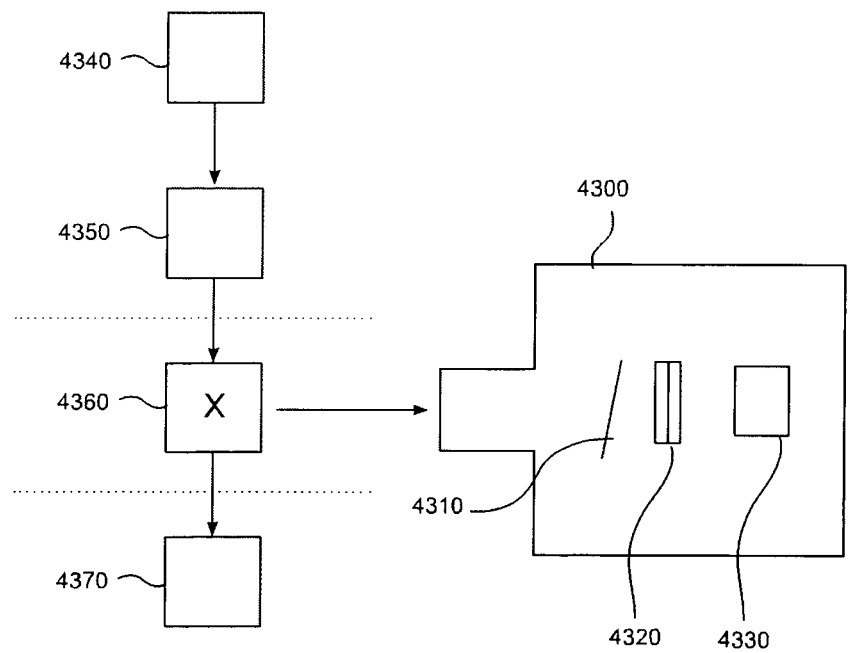
FIG. 43 is a schematic drawing showing object priority camera activation in which a camera is programmed to capture an image when a specific threshold, such as the appearance of an object, is satisfied.

FIG. 43 shows object priority camera activation in which a camera is programmed to capture an image when a specific threshold, such as the appearance of an object, is satisfied. The object is shown moving from position 4340 to position 4350 to position 4360 to position 4370. The camera (4300), shown with the mirror (4310), sensor (4320) and storage (4330) apparatuses, is programmed to capture the image at position X (4360). When the scene satisfies the location object threshold, the camera captures and processes the image.

FIG. 44 shows the process of using a camera to capture an image after an exposure preference is satisfied. Once the camera is programmed for exposure priority camera activation (EPCA) (4400), the image field satisfies a specific present exposure preference (4410). Once satisfied, the camera activates the shutter (4420) and captures the image (4430).

FIG. 45 shows the process of modifying a camera ISO to capture an image. After the user sets the camera aperture and shutter speed (4500), the scene is darkened (4510) and the camera CPU calculates the exposure (4520). The camera ISO is re-set to capture the image with the correct exposure (4530), the user captures the image and the image file is stored (4540).

FIG. 46 shows the process of modifying a camera ISO, aperture and shutter speed to capture an image. The user first selects an upper limit of ISO in the camera (4600). The camera then measures the scene exposure and calculates the aperture and SS setting (4610). The camera adjusts the ISO to the upper limit (4620) as required and then adjusts the SS setting (4630) and the aperture setting (4640). The camera selects the ISO, aperture and SS settings (4650), captures the image and stores the image file (4660).

Figure 47:
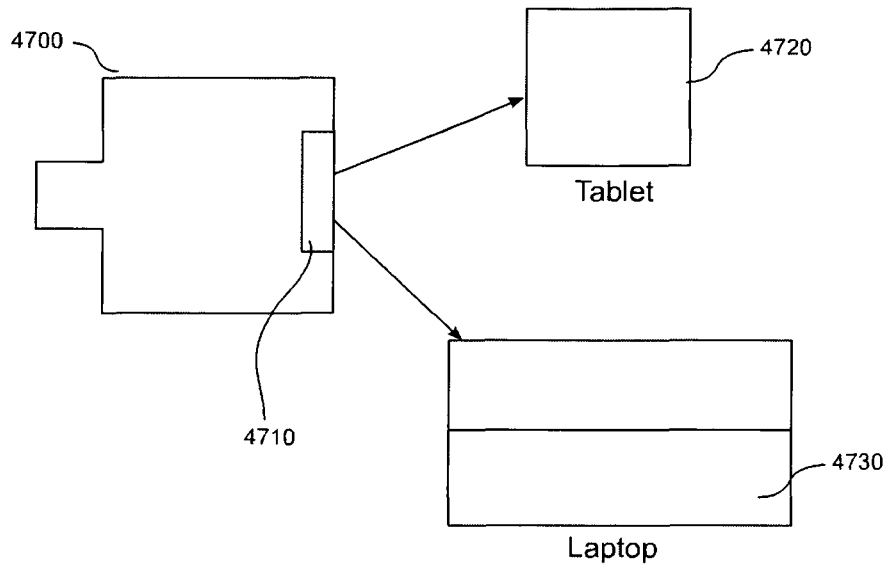
FIG. 47 is a schematic drawing showing camera display information sent to an external device.

FIG. 47 shows camera display information sent to an external device. The camera (4700) is shown with a display (4710). Once the display information is available from an image file, the image file is sent to an external laptop computer (4730) and/or tablet (4720) computer for viewing and filtration.

Figure 48:
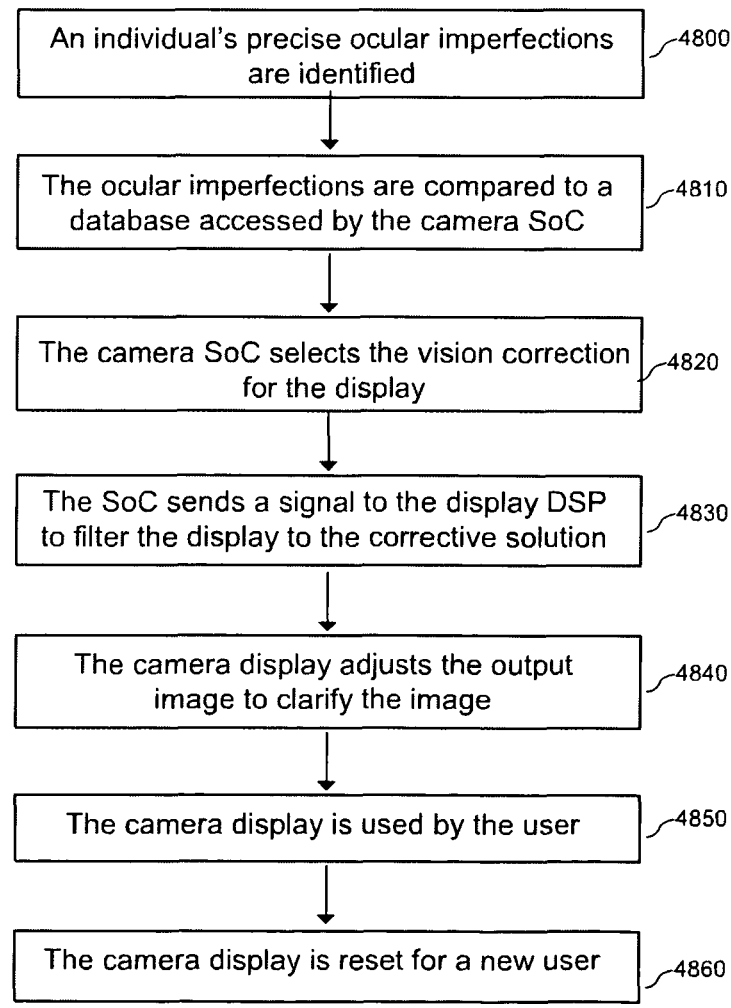
FIG. 48 is a flow chart showing the process of modifying a camera display to correct a user's vision.

FIG. 48 shows the process of modifying a camera display to correct a user's vision. After an individual's precise ocular imperfections are identified (4800), the ocular imperfections are compared to a database accessed by the camera SoC (4810). The camera SoC selects the vision correction for the display (4820) based on its recommendation of the user's ocular imperfections and sends a signal to the display DSP to filter the display to the corrective solution (4830). The camera display adjusts the output image to clarify the image (4840) and the camera display is used by the user (4850). The specific ocular corrections are saved for this user. The camera display is then reset for a new user (4860).

Figure 49:
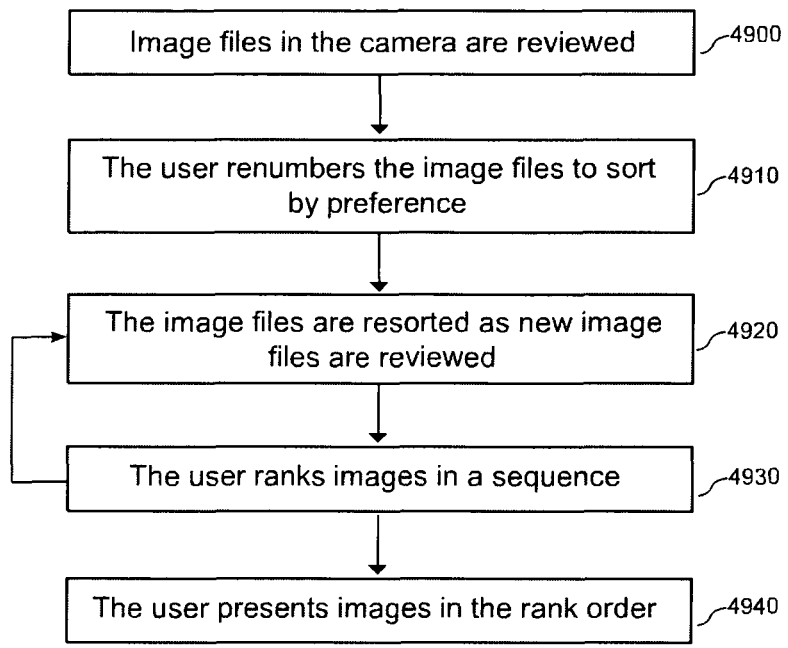
FIG. 49 is a flow chart showing the process of ranking images in a camera by a user.

FIG. 49 shows the process of ranking images in a camera by a user. After the image files in the camera are reviewed (4900), the user renumbers the image files to sort by preference (4910). The image files are resorted as new image files are reviewed (4920) and the user ranks images in a sequence (4930). The images are continually resorted and reranked until the user is satisfied. The user then presents the images in the rank order (4940).

Figure 50:
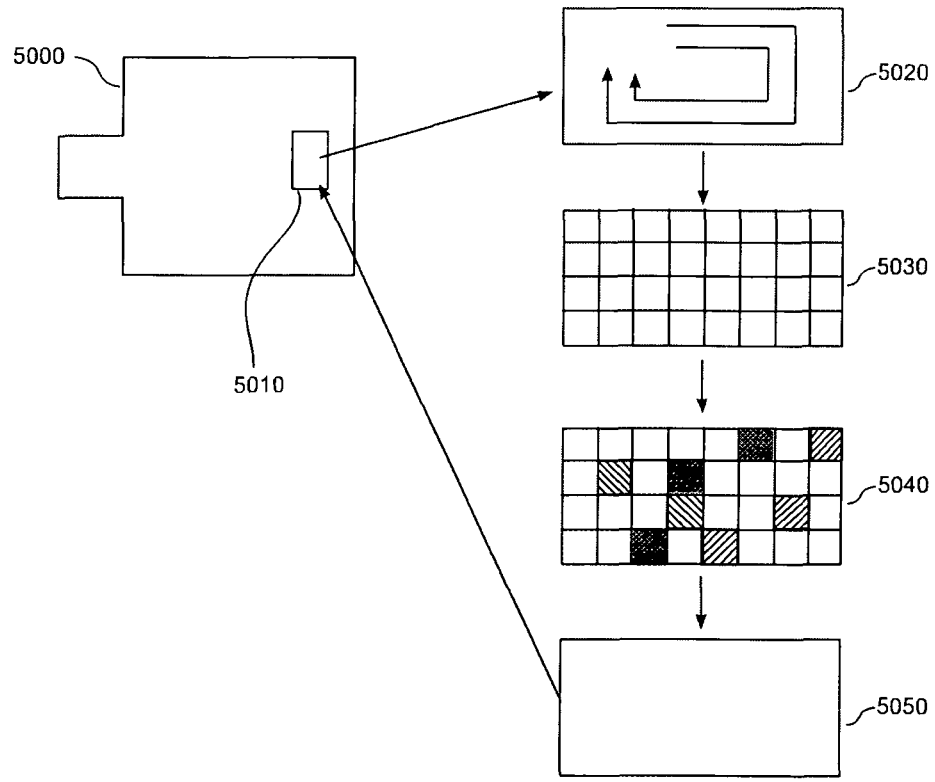
FIG. 50 is a schematic drawing showing image files sent to an external computer network for sorting, filtering, backing-up, storing and sharing image files.

FIG. 50 shows image files sent to an external computer network for sorting, filtering, backing-up, storing and sharing image files. The camera (5000) is shown with a storage (5010) apparatus. The image files are sent to an external computer (5020) for sorting (5030) and filtering (5040). The images are then backed up and stored (5050). The filtered and sorted image files are then returned to the camera for viewing.

I claim:

1. A digital imaging system for image optimization comprising: a digital camera, an optical lens, a digital sensor, a CPU, a digital signal processor (DSP), a communications circuit, an external computer, a database management system, a memory storage
    and a processor executing the following steps: a first step of processing digital files from the digital sensor and identifying image filtration problems by accessing the database management system and comparing unfiltered image files to image files in the database; a second step of requesting a software solution from said external computer; a third step of identifying software solutions in said external computer and forwarding at least one algorithm to said digital camera; a fourth step of applying the at least one algorithm to the image file and saving the optimized file to said memory storage.

2. A method of image optimization which comprises: a digital camera, an optical lens, a digital sensor, a CPU, a digital signal processor (DSP), a database management system, a communications circuit, a memory storage, an external computer; and a processor executing the following steps: a first step of processing digital files from the digital sensor and identifying image filtration problems by accessing the database management system and comparing unfiltered image files to image files in the database; a second step of requesting a software solution from said external computer; a third step of identifying software solutions in said external computer and forwarding at least one algorithm to said digital camera; a fourth step of applying the at least one algorithm to the image file and saving the optimized file to said memory storage.

3. A digital imaging system for image optimization comprising: a digital camera, an optical lens, a digital sensor, a CPU, a digital signal processor (DSP), communications circuit, external computer, database management system, camera memory, and a processor executing the following steps: a first step of processing digital file and identify image filtration problems by accessing the database management system and comparing unfiltered image files to image files in the database; a second step of requesting a software solution from an external computer; a third step of identifying software solutions in said external computer and sending the digital image to said external computer; a fourth step of applying the at least one algorithm to the image file in said external computer; a fifth step of sending the optimized file back to said digital camera; and a sixth step of saving the optimized file in said camera memory.

* * * * *